US012715296B2

(12) United States Patent
Suzuki

(10) Patent No.: US 12,715,296 B2
(45) Date of Patent: Aug. 25, 2026

(54) THERMAL MANAGEMENT SYSTEM

(71) Applicant: TOYOTA JIDOSHA KABUSHIKI KAISHA, Toyota (JP)

(72) Inventor: Tomoaki Suzuki, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 284 days.

(21) Appl. No.: 18/402,993

(22) Filed: Jan. 3, 2024

(65) Prior Publication Data

US 2024/0300332 A1 Sep. 12, 2024

(30) Foreign Application Priority Data

Mar. 9, 2023 (JP) ................................ 2023-036609

(51) Int. Cl.

| | |
|---|---|
| ***B60L 1/02*** | (2006.01) |
| ***B60H 1/00*** | (2006.01) |
| ***B60L 58/24*** | (2019.01) |
| ***H01M 10/48*** | (2006.01) |
| ***H01M 10/613*** | (2014.01) |
| ***H01M 10/615*** | (2014.01) |
| ***H01M 10/625*** | (2014.01) |
| ***H01M 10/633*** | (2014.01) |
| ***H01M 10/6568*** | (2014.01) |
| ***H01M 10/663*** | (2014.01) |

(52) U.S. Cl.

CPC ............ *B60L 1/02* (2013.01); *B60H 1/00278* (2013.01); *B60H 1/00392* (2013.01); *B60H 1/00907* (2013.01); *B60L 58/24* (2019.02); *H01M 10/486* (2013.01); *H01M 10/613* (2015.04); *H01M 10/615* (2015.04); *H01M 10/625* (2015.04); *H01M 10/633* (2015.04); *H01M 10/6568* (2015.04); *H01M 10/663* (2015.04); *H01M 2220/20* (2013.01)

(58) Field of Classification Search

CPC ....... B60L 1/02; B60L 58/24; B60H 1/00278; B60H 1/00392; B60H 1/00907; H01M 10/486; H01M 10/613; H01M 10/615; H01M 10/625; B60K 11/02

See application file for complete search history.

(56) References Cited

U.S. PATENT DOCUMENTS

| | | | | |
|---|---|---|---|---|
| 9,701,215 | B1 * | 7/2017 | Kim | B60L 58/33 |
| 11,541,719 | B1 * | 1/2023 | Richardson | B60H 1/004 |

(Continued)

FOREIGN PATENT DOCUMENTS

| | | |
|---|---|---|
| CN | 115027205 A | 9/2022 |
| CN | 115107457 A | 9/2022 |

(Continued)

*Primary Examiner* — Erez Gurari

(74) *Attorney, Agent, or Firm* — Oliff PLC

(57) ABSTRACT

A thermal management system includes: an electrical storage device located in a first flow path; a drive device located in a second flow path; a radiator located in a third flow path, a chiller device located in a fourth flow path, and a switching device. In the thermal management system, when heating the electrical storage device, the switching device is controlled so as to cause a heating circuit having one heat medium path in which a heat medium circulates through the first flow path, the fourth flow path, the second flow path, and the third flow path to be formed.

6 Claims, 24 Drawing Sheets

(56) References Cited

U.S. PATENT DOCUMENTS

| | | | | |
|---|---|---|---|---|
| 11,707,968 | B2 * | 7/2023 | Wada | B60H 1/00735 62/333 |
| 11,898,657 | B2 * | 2/2024 | Schoeneman | F01P 7/165 |
| 11,904,728 | B2 * | 2/2024 | Li | B60H 1/00485 |
| 12,337,656 | B2 * | 6/2025 | Suzuki | B60H 1/00278 |
| 12,403,746 | B2 * | 9/2025 | Nilsson | B60H 1/00642 |
| 2015/0266392 | A1 | 9/2015 | Arai et al. | |
| 2017/0158081 | A1 * | 6/2017 | Kim | B60H 1/00278 |
| 2017/0297414 | A1 * | 10/2017 | Beloe | B60H 1/00885 |
| 2018/0154734 | A1 * | 6/2018 | Lee | H01M 10/613 |
| 2019/0061470 | A1 * | 2/2019 | Koberstein | B60H 1/00392 |
| 2020/0047591 | A1 * | 2/2020 | He | B60H 1/32284 |
| 2021/0296964 | A1 * | 9/2021 | Sakamoto | H05K 7/20872 |
| 2022/0371402 | A1 * | 11/2022 | Hasegawa | H01M 10/625 |
| 2022/0371403 | A1 * | 11/2022 | Miyoshi | B60H 1/32284 |
| 2022/0390323 | A1 * | 12/2022 | Sakamoto | G01M 13/003 |
| 2023/0091458 | A1 | 3/2023 | Suzuki et al. | |
| 2024/0116331 | A1 * | 4/2024 | Tiemeyer | B60H 1/143 |
| 2024/0131919 | A1 * | 4/2024 | Suzuki | H01M 10/66 |
| 2024/0175612 | A1 * | 5/2024 | Takagi | F25B 45/00 |
| 2024/0262165 | A1 * | 8/2024 | Matsutani | B60H 1/2218 |
| 2024/0300320 | A1 * | 9/2024 | Suzuki | B60K 11/085 |
| 2024/0300332 | A1 * | 9/2024 | Suzuki | B60H 1/00485 |
| 2024/0304900 | A1 * | 9/2024 | Suzuki | B60K 11/085 |
| 2024/0399818 | A1 * | 12/2024 | Kim | B60H 1/00278 |
| 2025/0300268 | A1 * | 9/2025 | Miyoshi | B60L 58/27 |

FOREIGN PATENT DOCUMENTS

| | | | |
|---|---|---|---|
| EP | 3 923 398 | A1 | 12/2021 |
| EP | 4 105 046 | A1 | 12/2022 |
| JP | 2010-272395 | A | 12/2010 |
| JP | 2011-255879 | A | 12/2011 |
| JP | 2017-105290 | A | 6/2017 |
| WO | 2022/004159 | A1 | 1/2022 |
| WO | 2022/263050 | A1 | 12/2022 |

* cited by examiner

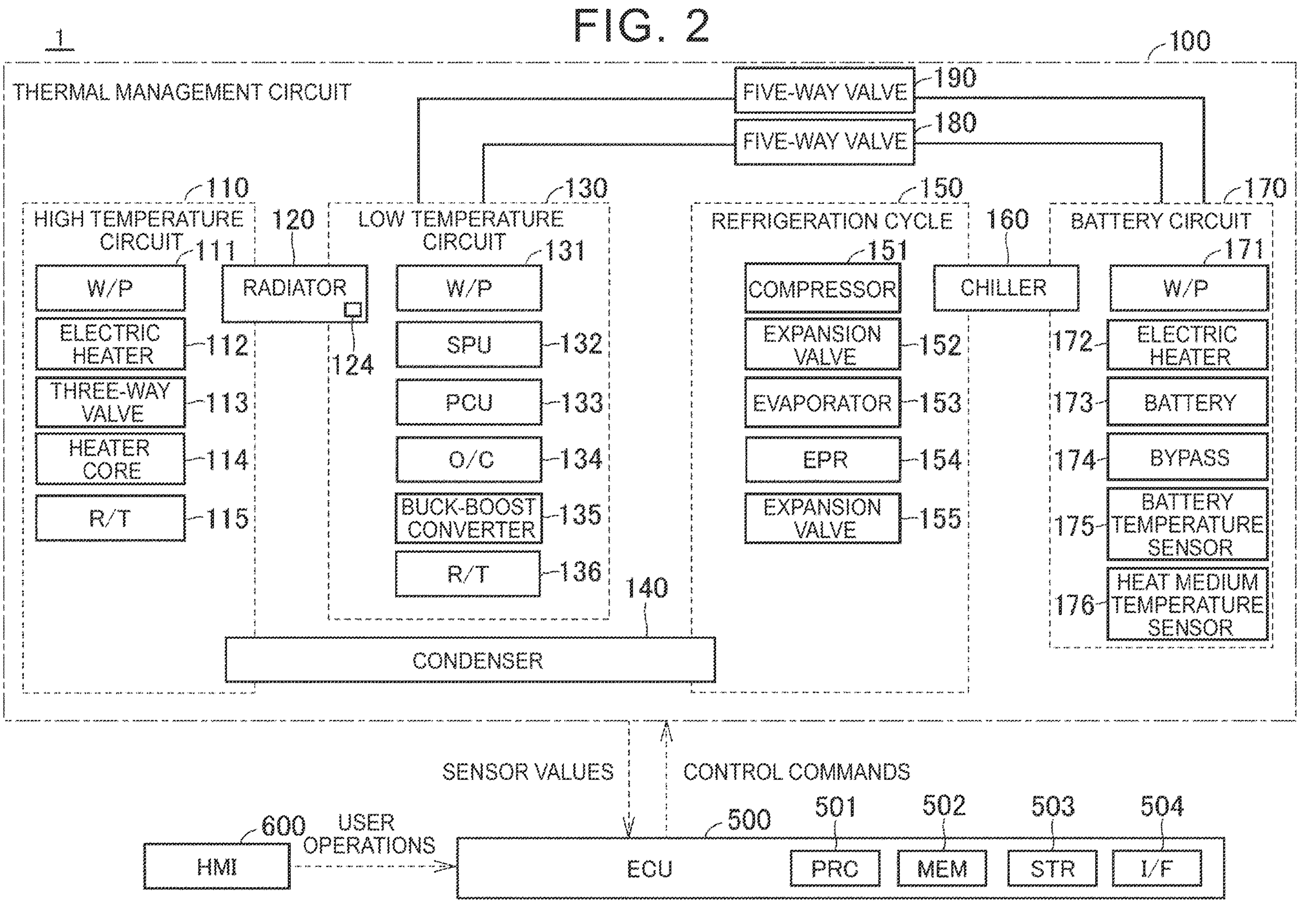

FIG. 2
1
100
THERMAL MANAGEMENT CIRCUIT
FIVE-WAY VALVE
190
FIVE-WAY VALVE
180
110
HIGH TEMPERATURE CIRCUIT
111
W/P
ELECTRIC HEATER
112
THREE-WAY VALVE
113
HEATER CORE
114
R/T
115
120
RADIATOR
124
130
LOW TEMPERATURE CIRCUIT
131
W/P
SPU
132
PCU
133
O/C
134
BUCK-BOOST CONVERTER
135
R/T
136
140
CONDENSER
150
REFRIGERATION CYCLE
151
COMPRESSOR
EXPANSION VALVE
152
EVAPORATOR
153
EPR
154
EXPANSION VALVE
155
160
CHILLER
170
BATTERY CIRCUIT
171
W/P
172
ELECTRIC HEATER
173
BATTERY
174
BYPASS
175
BATTERY TEMPERATURE SENSOR
176
HEAT MEDIUM TEMPERATURE SENSOR
SENSOR VALUES
CONTROL COMMANDS
600
HMI
USER OPERATIONS
500
ECU
501
PRC
502
MEM
503
STR
504
I/F

100
BUCK-BOOST CONVERTER
O/C
PCU
SPU
ELECTRIC HEATER
BATTERY
EPR
EVAPORATOR
ELECTRIC HEATER
HEATER CORE
R/T
R/T
P1
P2
P3
P4
P5
P11
P12
P13
P14
P15
110
111
112
113
114
115
120
121
122
124
130
130a
130b
131
132
133
134
135
136
140
150
151
152
153
154
155
160
170
170a
170b
171
172
173
174
175
176
180
190

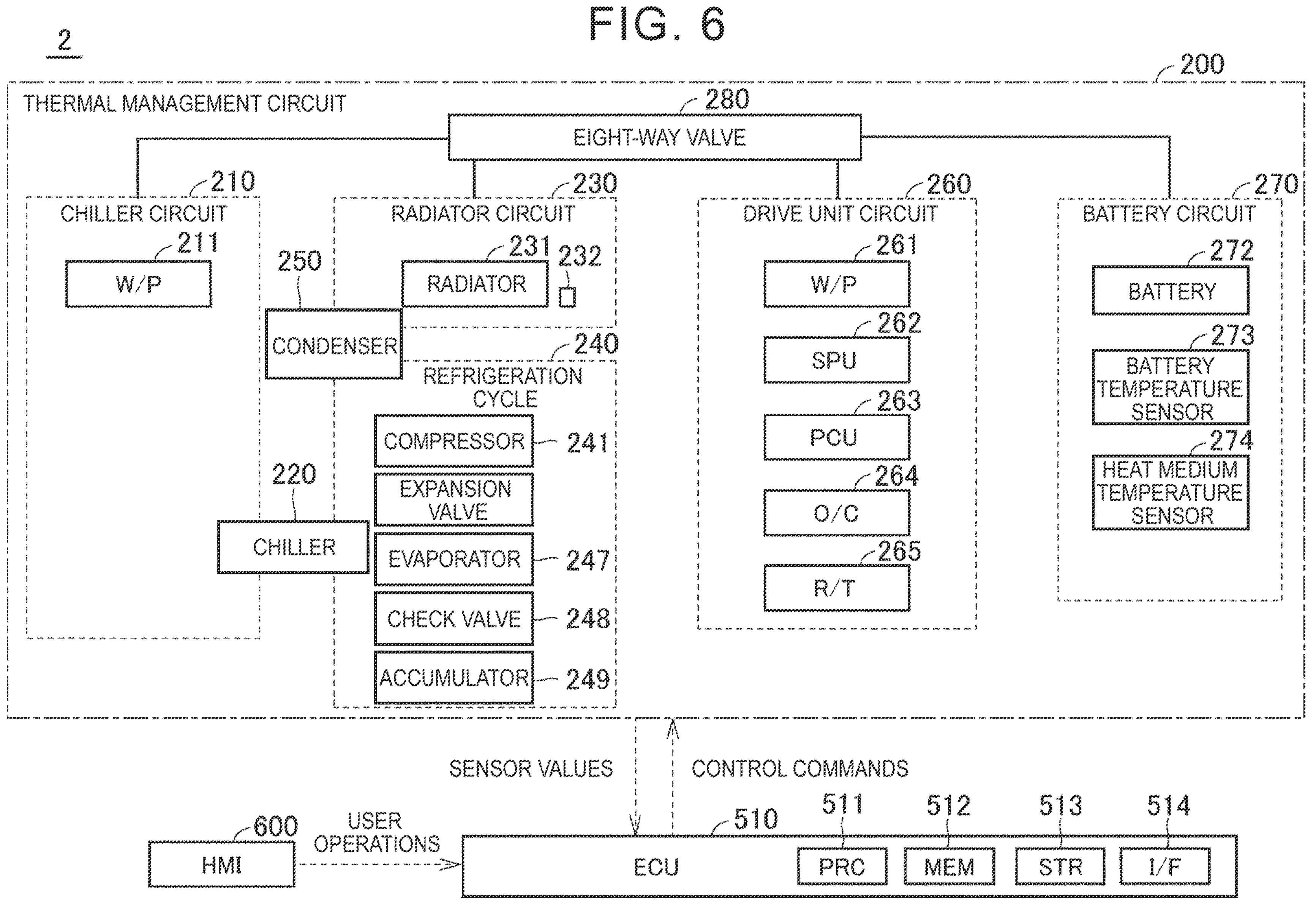
FIG. 6
2
200
THERMAL MANAGEMENT CIRCUIT
280
EIGHT-WAY VALVE
210
CHILLER CIRCUIT
211
W/P
250
CONDENSER
220
CHILLER
230
RADIATOR CIRCUIT
231
RADIATOR
232
240
REFRIGERATION CYCLE
COMPRESSOR
241
EXPANSION VALVE
EVAPORATOR
247
CHECK VALVE
248
ACCUMULATOR
249
260
DRIVE UNIT CIRCUIT
261
W/P
262
SPU
263
PCU
264
O/C
265
R/T
270
BATTERY CIRCUIT
272
BATTERY
273
BATTERY TEMPERATURE SENSOR
274
HEAT MEDIUM TEMPERATURE SENSOR
SENSOR VALUES
CONTROL COMMANDS
600
HMI
USER OPERATIONS
510
ECU
511
PRC
512
MEM
513
STR
514
I/F 200
249
ACCUMULATOR
241
240
242
247
EVAPORATOR
245
248
250
252
244A
220
246
232
251
244B
210
231
211
230
230b
P25
P23
P27
230a
280
P26
EIGHT-WAY VALVE
P21
P24
P28
265
P22
260
270
R/T
264
272
261
O/C
273
BATTERY
274
262
263
SPU
PCU

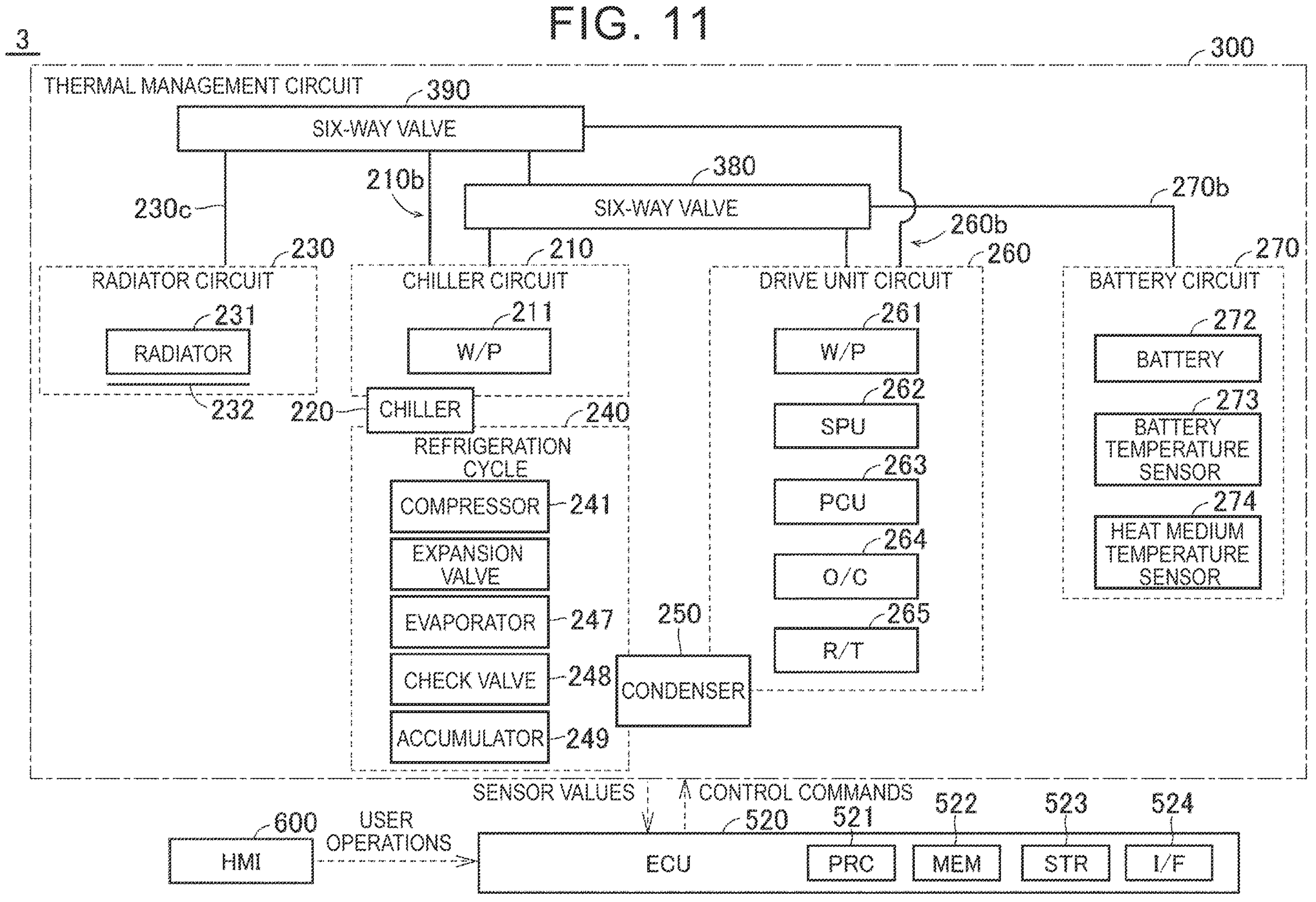
FIG. 11
3
300
THERMAL MANAGEMENT CIRCUIT
390
SIX-WAY VALVE
380
SIX-WAY VALVE
210b
230c
260b
270b
230
RADIATOR CIRCUIT
231
RADIATOR
232
210
CHILLER CIRCUIT
211
W/P
220
CHILLER
240
REFRIGERATION CYCLE
COMPRESSOR
241
EXPANSION VALVE
EVAPORATOR
247
CHECK VALVE
248
ACCUMULATOR
249
250
CONDENSER
260
DRIVE UNIT CIRCUIT
261
W/P
262
SPU
263
PCU
264
O/C
265
R/T
270
BATTERY CIRCUIT
272
BATTERY
273
BATTERY TEMPERATURE SENSOR
274
HEAT MEDIUM TEMPERATURE SENSOR
SENSOR VALUES
CONTROL COMMANDS
600
HMI
USER OPERATIONS
520
ECU
521
PRC
522
MEM
523
STR
524
I/F 400
ACCUMULATOR
EVAPORATOR
TEN-WAY VALVE
R/T
BATTERY
SPU
PCU
O/C
249
241
240
242
247
245
248
250
252
244A
220
246
232
251
244B
210c
210
231
211
230d
230
230e
480
P55
P53
P57
P59
P56
P51
P50
P54
P58
P52
270c
270
265
260
270d
273
272
261
264
274
262
263
260c

THERMAL MANAGEMENT SYSTEM

CROSS-REFERENCE TO RELATED APPLICATION

This application claims priority to Japanese Patent Application No. 2023-036609 filed on Mar. 9, 2023, incorporated herein by reference in its entirety.

BACKGROUND

1. Technical Field

The present disclosure relates to thermal management systems.

2. Description of Related Art

Japanese Unexamined Patent Application Publication No. 2010-272395 (JP 2010-272395 A) discloses an electrified vehicle. The electrified vehicle includes an electrical storage device (battery), an inverter, a motor, and a control device. The electrical storage device is connected to the inverter. The inverter is connected to the motor. The control device controls the current of the electrical storage device by controlling switching of the inverter. The control device thus controls heat that is generated due to power loss in the internal resistance of the electrical storage device. As a result, the control device can perform heating control for increasing the temperature of the electrical storage device using the current of the electrical storage device (self-heating of the electrical storage device).

SUMMARY

In electrical apparatus such as electrified vehicles, it is sometimes important to effectively use heat from a drive device including an inverter and a motor. It is also desired to efficiently perform self-heating of an electrical storage device. That is, it is desired to efficiently perform self-heating of the electrical storage device while allowing effective use of the heat generated by the drive device.

The present disclosure provides a thermal management system that can efficiently perform self-heating of an electrical storage device while allowing efficient use of heat generated by a drive device.

A thermal management system according to one aspect of the present disclosure is a thermal management system mounted on an electrical apparatus. The thermal management system includes: a first flow path, a second flow path, a third flow path, and a fourth flow path, each configured to allow a heat medium to flow through the flow path; an electrical storage device configured to exchange heat with the heat medium in the first flow path; a drive device configured to exchange heat with the heat medium in the second flow path and to supply a driving force to the electrical apparatus; a radiator located in the third flow path; a chiller device located in the fourth flow path; and a switching device configured to switch a connection state between the first flow path, the second flow path, the third flow path, and the fourth flow path. The switching device is configured to cause a heating circuit to be formed when performing heating for increasing a temperature of the electrical storage device by causing a current to flow through the electrical storage device, the heating circuit including one heat medium path in which the heat medium circulates through the first flow path, the second flow path, the third flow path, and the fourth flow path.

With this configuration, heat from self-heating of the electrical storage device and heat generated by the drive device can be stored in the heat medium in the heating circuit. It is therefore possible to efficiently perform self-heating of the electrical storage device while allowing effective use of the heat generated by the drive device.

In one embodiment, the radiator may be provided with a shutoff device configured to switch between an introducing state in which introduction of outside air into the radiator is allowed and a shutoff state in which the introduction of the outside air into the radiator is not allowed. The shutoff device may be configured to be switched to the shutoff state when the heating circuit is formed.

With this configuration, heat accumulated in the heat medium in the heating circuit is less likely to be dissipated to the outside air via the radiator.

In another embodiment, the drive device may be configured to supply the driving force to an electrified vehicle that is the electrical apparatus. The heating of the electrical storage device may be performed when a traction system of the electrified vehicle is activated.

With this configuration, the temperature of the electrical storage device can be easily increased when the electrified vehicle starts to travel. As a result, the traveling performance of the electrified vehicle can be easily increased to a certain level or higher when the electrified vehicle starts to travel.

In still another embodiment, the electrical storage device may be configured to perform external charging, the external charging being charging of the electrical storage device with charging power supplied from charging equipment external to the electrical apparatus. The heating of the electrical storage device may be performed at start of the external charging in such a manner that the temperature of the electrical storage device becomes equal to or higher than a predetermined temperature.

With this configuration, the temperature of the electrical storage device can be easily increased to the predetermined temperature or higher by the time the external charging starts. As a result, the charging rate and charging efficiency can be easily increased to a certain level or higher at the start of the external charging.

In yet another embodiment, the thermal management system may further include: a first temperature sensor configured to measure the temperature of the electrical storage device; a second temperature sensor configured to measure a temperature of the heat medium in the first flow path; and a pump configured to circulate the heat medium in the heating circuit. The pump may be stopped when a measured value from the first temperature sensor is higher than a measured value from the second temperature sensor during the heating with the heating circuit formed. The pump may be driven when the measured value from the first temperature sensor is equal to or less than the measured value from the second temperature sensor during the heating with the heating circuit formed.

With this configuration, when the measured value from the first temperature sensor is higher than the measured value from the second temperature sensor, the pump is stopped, so that the heat medium in the first flow path does not flow. Therefore, the heat from the electrical storage device is less likely to transfer to the heat medium in the first flow path. When the measured value from the first temperature sensor is equal to or less than the measured value from the second temperature sensor, the pump is driven, so that the heat medium in the first flow path flows. Therefore, the heat from the heat medium in the first flow path can be transferred to the electrical storage device.

In a further embodiment, the drive device may be configured to supply the driving force to the electrified vehicle that is the electrical apparatus. The chiller device may be configured to exchange heat with an air conditioning circuit configured to adjust a cabin temperature of the electrified vehicle. The switching device may be configured to cause the heating circuit to be formed when there is a request to turn on a heater using the air conditioning circuit when performing the heating of the electrical storage device.

With this configuration, the heat from self-heating of the electrical storage device can be effectively used in the air conditioning circuit.

In a still further embodiment, in the heating circuit, the second flow path may be located upstream of the first flow path in a flow of the heat medium.

In a yet further embodiment, the thermal management system may further include a control device. The switching device may include a first five-way valve and a second five-way valve. The first flow path may connect the first five-way valve, the electrical storage device, and the second five-way valve in this order. The second flow path may connect the second five-way valve, the drive device, and the first five-way valve in this order. The third flow path may connect the first five-way valve, the radiator, and the second five-way valve in this order. The fourth flow path may connect the second five-way valve, the chiller device, and the first five-way valve in this order. The control device may be configured to cause the heating circuit to be formed by controlling the first five-way valve and the second five-way valve in such a manner that the second flow path and the first flow path are connected via the first five-way valve, the first flow path and the fourth flow path are connected via the second five-way valve, the fourth flow path and the third flow path are connected via the first five-way valve, and the third flow path and the second flow path are connected via the second five-way valve.

In a yet further embodiment, the thermal management system may further include a control device. The switching device may include an eight-way valve. The first flow path may connects a first port of the eight-way valve, the electrical storage device, and a second port of the eight-way valve in this order. The second flow path may connect a third port of the eight-way valve, the drive device, and a fourth port of the eight-way valve in this order. The third flow path may connect a fifth port of the eight-way valve, the radiator, and a sixth port of the eight-way valve in this order. The fourth flow path may connect a seventh port of the eight-way valve, the chiller device, and an eighth port of the eight-way valve in this order. The control device may be configured to cause the heating circuit to be formed by controlling the eight-way valve in such a manner that the first flow path and the second flow path are connected via the second port and the third port, the second flow path and the third flow path are connected via the fourth port and the fifth port, the third flow path and the fourth flow path are connected via the sixth port and the seventh port, and the fourth flow path and the first flow path are connected via the eighth port and the first port.

In a yet further embodiment, the thermal management system may further include a control device. The switching device may include an eight-way valve. The first flow path may connects a first port of the eight-way valve, the electrical storage device, and a second port of the eight-way valve in this order. The second flow path may connect a third port of the eight-way valve, the drive device, and a fourth port of the eight-way valve in this order. The third flow path may connect a fifth port of the eight-way valve, the radiator, and a sixth port of the eight-way valve in this order. The fourth flow path may connect a seventh port of the eight-way valve, the chiller device, and an eighth port of the eight-way valve in this order. The control device may be configured to cause the heating circuit to be formed by controlling the eight-way valve in such a manner that the second flow path and the first flow path are connected via the fourth port and the first port, the first flow path and the fourth flow path are connected via the second port and the seventh port, the fourth flow path and the third flow path are connected via the eighth port and the fifth port, and the third flow path and the second flow path are connected via the sixth port and the third port.

According to the present disclosure, it is possible to efficiently perform self-heating of the electrical storage device while allowing effective use of the heat generated by the drive device.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 shows an example of the overall configuration of the thermal management system according to the first embodiment;

FIG. 6 shows an example of the overall configuration of a thermal management system according to a second embodiment;

FIG. 11 shows an example of the overall configuration of a thermal management system according to a third embodiment;

DETAILED DESCRIPTION OF EMBODIMENTS

Embodiments of the present disclosure will be described in detail below with reference to the drawings. The same or corresponding parts are denoted by the same signs throughout the drawings, and description thereof will not be repeated.

First Embodiment

Figure 1:
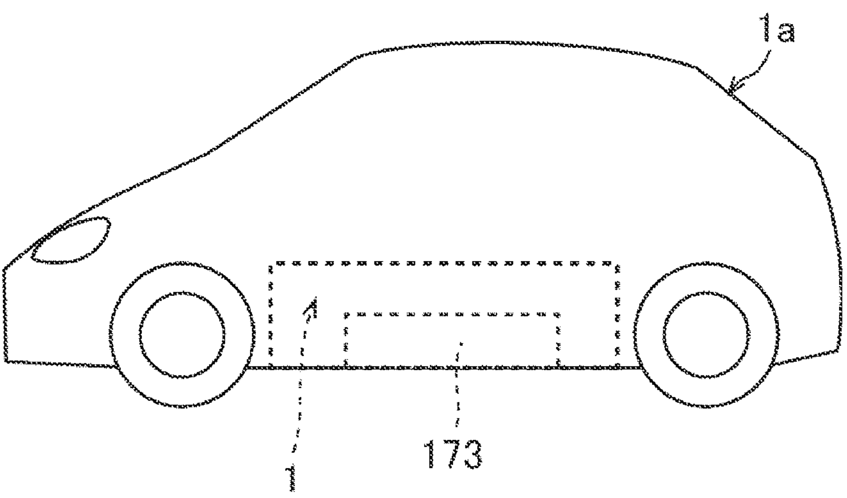
FIG. 1 shows an electrified vehicle equipped with a thermal management system according to a first embodiment.

Hereinafter, a configuration in which a thermal management system according to the present disclosure is mounted on an electrified vehicle 1*a* will be described as an example. FIG. 1 shows the electrified vehicle 1*a* equipped with a thermal management system according to a first embodiment. As shown in FIG. 1, the electrified vehicle 1*a* is preferably a vehicle equipped with a traction battery 173, and is, for example, a battery electric vehicle (BEV). The electrified vehicle 1*a* may be a hybrid electric vehicle (HEV), a plug-in hybrid electric vehicle (PHEV), or a fuel cell electric vehicle (FCEV). However, the thermal management system according to the present disclosure is not limited to vehicle applications. The electrified vehicle 1*a* is an example of the "electrical apparatus" of the present disclosure.

Overall Configuration

FIG. 2 shows an example of the overall configuration of a thermal management system 1 according to the first embodiment. The thermal management system 1 includes a thermal management circuit 100, an electronic control unit (ECU) 500, and a human machine interface (HMI) 600.

The thermal management circuit 100 is configured to allow a heat medium to flow therethrough. The thermal management circuit 100 includes, for example, a high temperature circuit 110, a radiator 120, a low temperature circuit 130, a condenser 140, a refrigeration cycle 150, a chiller 160, a battery circuit 170, a five-way valve 180, and a five-way valve 190. Each of the five-way valves 180, 190 is an example of the "switching device" of the present disclosure. The chiller 160 is an example of the "chiller device" of the present disclosure.

The high temperature circuit 110 includes, for example, a water pump (W/P) 111, an electric heater 112, a three-way valve 113, a heater core 114, and a reservoir tank (R/T) 115. The heater core 114 is an example of the "air conditioning circuit" of the present disclosure.

The radiator 120 is connected to both the high temperature circuit 110 and the low temperature circuit 130. That is, the radiator 120 is shared by the high temperature circuit 110 and the low temperature circuit 130. The radiator 120 includes a high temperature (HT) radiator 121 and a low temperature (LT) radiator 122 (see FIG. 3). The low temperature radiator 122 is an example of the "radiator" of the present disclosure. The low temperature radiator 122 is provided with a grille shutter 124 (see FIG. 3).

The low temperature circuit 130 includes, for example, a water pump 131, a smart power unit (SPU) 132, a power control unit (PCU) 133, an oil cooler (O/C) 134, a buck-boost converter 135, and a reservoir tank (R/T) 136. The PCU 133 and the oil cooler 134 are examples of the "drive device" of the present disclosure.

The condenser 140 is connected to both the high temperature circuit 110 and the refrigeration cycle 150.

The refrigeration cycle 150 includes, for example, a compressor 151, an expansion valve 152, an evaporator 153, an evaporative pressure regulator (EPR) 154, and an expansion valve 155.

The chiller 160 is connected to both the refrigeration cycle 150 and the battery circuit 170. The chiller 160 exchanges heat between the heat medium flowing in the battery circuit 170 and the heat medium circulating in the refrigeration cycle 150.

The battery circuit 170 includes, for example, a water pump (W/P) 171, an electric heater 172, a battery 173, a bypass flow path 174, a battery temperature sensor 175, and a heat medium temperature sensor 176. The water pump 171 and the battery 173 are examples of the "pump" and the "electrical storage device" of the present disclosure, respectively. The battery temperature sensor 175 and the heat medium temperature sensor 176 are examples of the "first temperature sensor" and the "second temperature sensor" of the present disclosure, respectively.

Each of the five-way valves 180, 190 is connected to the low temperature circuit 130 and the battery circuit 170. The configuration of the thermal management circuit 100 will be described in detail later with reference to FIG. 3.

The ECU 500 controls the thermal management circuit 100. The ECU 500 includes a processor 501, a memory 502, a storage 503, and an interface 504.

The processor 501 includes, for example, a central processing unit (CPU) or a micro-processing unit (MPU). The memory 502 includes, for example, a random access memory (RAM). The storage 503 includes a rewritable nonvolatile memory such as a hard disk drive (HDD), a solid state drive (SSD), or a flash memory. The storage 503 stores system programs including an operating system (OS), and control programs including computer-readable codes that are necessary for control calculations. The processor 501 implements various processes by reading the system programs and the control programs, loading them into the memory 502, and executing them. The interface 504 controls communication between the ECU 500 and components of the thermal management circuit 100.

The ECU 500 generates control commands based on sensor values acquired from various sensors (e.g., battery temperature sensor 175 and heat medium temperature sensor 176) included in the thermal management circuit 100, user operations received by the HMI 600, etc. The ECU 500 outputs the generated control commands to the thermal management circuit 100. The ECU 500 may be divided into a plurality of ECUs, one for each function. Although FIG. 2 illustrates an example in which the ECU 500 includes one processor 501, the ECU 500 may include a plurality of processors. The same applies to the memory 502 and the storage 503.

As used herein, the "processor" is not limited to a processor in a narrow sense that performs processes by a stored program method, and may include hardwired circuitry such as an application-specific integrated circuit (ASIC) and a field-programmable gate array (FPGA). Therefore, the term "processor" may be read as processing circuitry that performs processes defined in advance by either or both of computer-readable codes and hardwired circuitry.

The HMI 600 is, for example, a display with a touch panel, an operation panel, or a console. The HMI 600 receives user operations for controlling the thermal management system 1. The HMI 600 outputs signals indicating user operations to the ECU 500.

Configuration of Thermal Management Circuit

Figure 3:
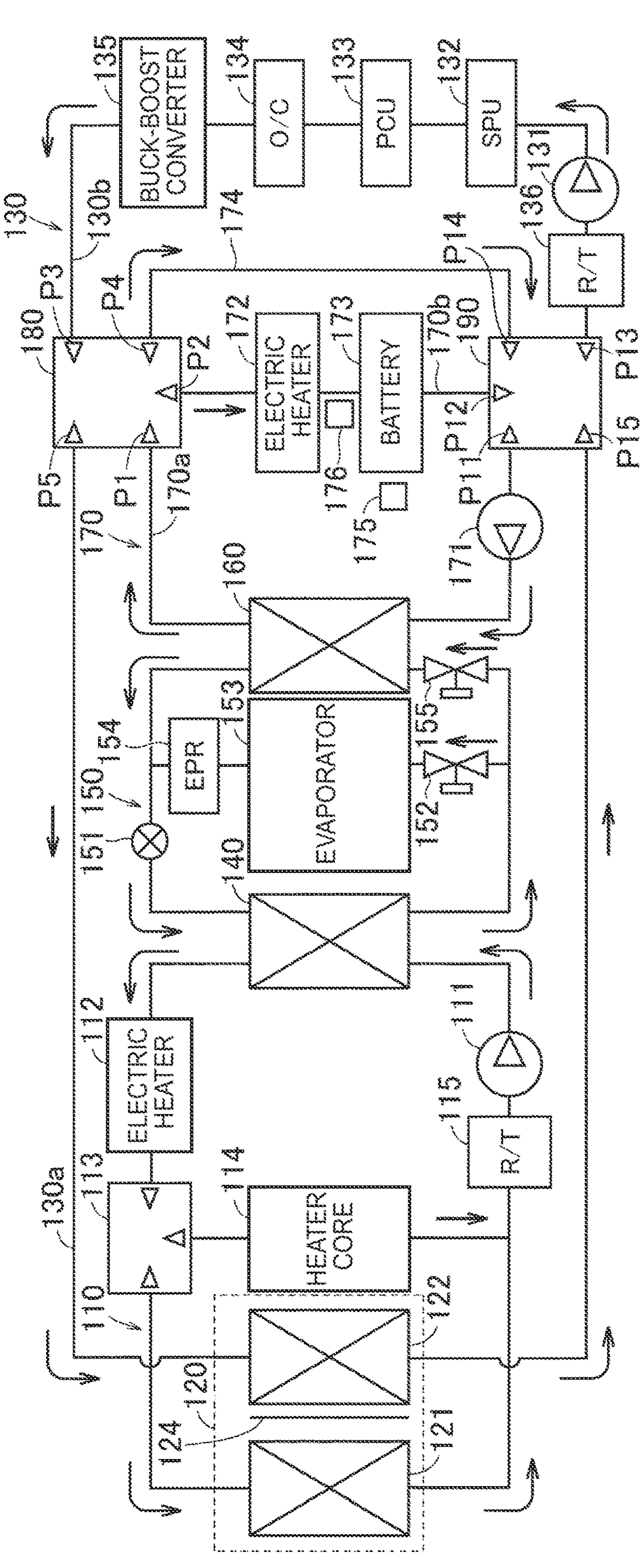
FIG. 3 shows an example of the configuration of a thermal management circuit according to the first embodiment.

FIG. 3 shows an example of the configuration of the thermal management circuit 100 according to the first embodiment. A heat medium (usually hot water) circulating in the high temperature circuit 110 flows through either or both of a first path and a second path. The first path configured so that the heat medium flows through the following path:

water pump 111—condenser 140—electric heater 112—three-way valve 113—heater core 114—reservoir tank 115—water pump 111. The second path configured so that the heat medium flows through the following path: water pump 111—condenser 140—electric heater 112—three-way valve 113—high temperature radiator 121—reservoir tank 115—water pump 111.

The heat medium (coolant) circulating in the low temperature circuit 130 flows through a path of "water pump 131—SPU 132—PCU 133—oil cooler 134—buck-boost converter 135—five-way valve 180—low temperature radiator 122—five-way valve 190—reservoir tank 136—water pump 131."

The water pump 131 circulates the heat medium in the low temperature circuit 130 according to a control command from the ECU 500. The SPU 132 controls charge and discharge of the battery 173 according to a control command from the ECU 500.

The PCU 133 converts direct current (DC) power supplied from the battery 173 to alternating current (AC) power to supply the AC power to a motor (not shown) contained in a transaxle according to a control command from the ECU 500. The oil cooler 134 circulates lubricating oil for the motor using an electrical oil pump (EOP), not shown. The oil cooler 134 cools the transaxle through heat exchange between the heat medium circulating in the low temperature circuit 130 and the lubricating oil for the motor. The SPU 132, the PCU 133, the oil cooler 134, and the buck-boost converter 135 are cooled by the heat medium circulating in the low temperature circuit 130. The reservoir tank 136 stores part of the heat medium flowing in the low temperature circuit 130 to maintain the pressure and amount of heat medium in the low temperature circuit 130. Each of the five-way valves 180, 190 switches the path of the heat medium in the low temperature circuit 130 and the battery circuit 170 according to a control command from the ECU 500. The low temperature radiator 122 is disposed near the high temperature radiator 121, and exchanges heat with the high temperature radiator 121. Instead of the oil cooler 134, the transaxle may be provided in the low temperature circuit 130. The grille shutter 124 is configured to switch between a closed state and an open state according to a control signal from the ECU 500. In the closed state, the grille shutter 124 does not allow introduction of outside air into the low temperature radiator 122. In the open state, the grille shutter 124 allows introduction of outside air into the low temperature radiator 122. The grille shutter 124 is an example of the "shutoff device" of the present disclosure.

The heat medium (gas-phase refrigerant or liquid-phase refrigerant) circulating in the refrigeration cycle 150 flows through either or both of a first path and a second path. The first path is configured so that the heat medium flows through the following path: compressor 151—condenser 140—expansion valve 152—evaporator 153—EPR 154—compressor 151. The second path is configured so that the heat medium flows through the following path: compressor 151—condenser 140—expansion valve 155—chiller 160—compressor 151.

The heat medium (coolant) circulating in the battery circuit 170 flows through either or both of a first path and a second path. The first path is configured so that the heat medium flows through the following path: water pump 171—chiller 160—five-way valve 180—electric heater 172—battery 173—five-way valve 190—water pump 171. The second path is configured so that the heat medium flows through the following path: water pump 171—chiller 160—five-way valve 180—bypass flow path 174—five-way valve 190—water pump 171.

The water pump 171 circulates the heat medium in the battery circuit 170 according to a control command from the ECU 500. The chiller 160 cools the heat medium circulating in the battery circuit 170 through heat exchange between the heat medium circulating in the refrigeration cycle 150 and the heat medium circulating in the battery circuit 170. The electric heater 172 heats the heat medium according to a control command from the ECU 500. The battery 173 supplies traction power to the motor contained in the transaxle. The battery 173 may be heated with the electric heater 172 or may be cooled with the chiller 160. The bypass flow path 174 is provided to allow the heat medium to bypass the electric heater 172 and the battery 173. When the heat medium flows through the bypass flow path 174, a change in temperature of the heat medium associated with heat absorption and heat dissipation between the heat medium and the battery 173 can be reduced. The battery temperature sensor 175 detects the temperature of the battery 173. The heat medium temperature sensor 176 detects the temperature of the heat medium flowing in the battery circuit 170.

The five-way valve 180 includes five ports P1 to P5. The port P1 is an inlet port into which the heat medium flows from the chiller 160. The port P2 is an outlet port through which the heat medium flows toward the electric heater 172 and the battery 173 of the battery circuit 170. The port P3 is an inlet port into which the heat medium flows from the SPU 132, the PCU 133, the oil cooler 134, and the buck-boost converter 135 of the low temperature circuit 130. The port P4 is an outlet port from which the heat medium flows toward the bypass flow path 174 of the battery circuit 170. The port P5 is an outlet port from which the heat medium flows toward the low temperature radiator 122.

The five-way valve 190 includes five ports P11 to P15. The port P11 is an outlet port from which the heat medium flows toward the chiller 160. The port P12 is an inlet port into which the heat medium flows from the electric heater 172 and the battery 173 of the battery circuit 170. The port P13 is an outlet port from which the heat medium flows toward the SPU 132, the PCU 133, the oil cooler 134, and the buck-boost converter 135 of the low temperature circuit 130. The port P14 is an inlet port into which the heat medium flows from the bypass flow path 174 of the battery circuit 170. The port P15 is an inlet port into which the heat medium flows from the low temperature radiator 122.

Figure 4:
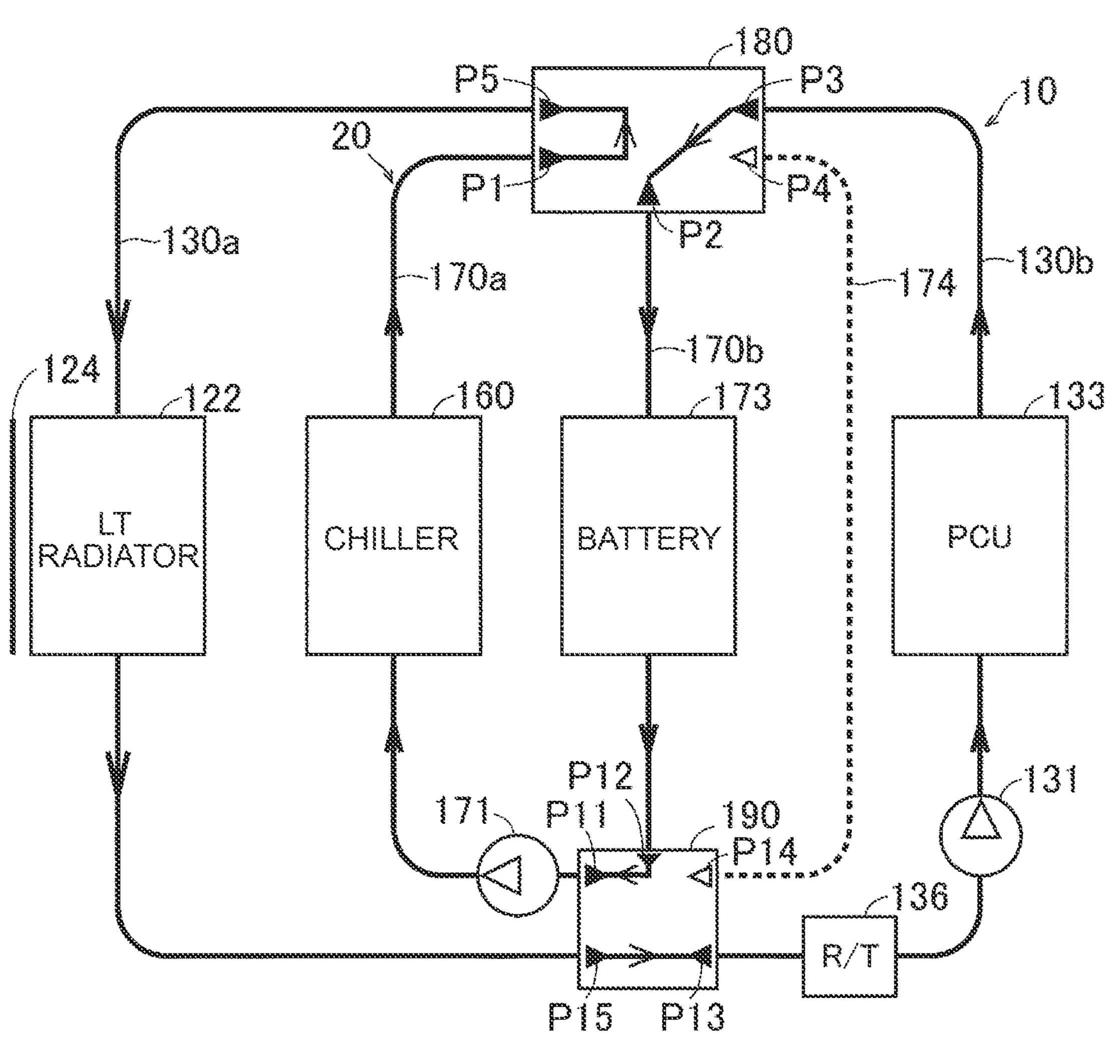
FIG. 4 shows the state of the thermal management circuit when heating a battery according to the first embodiment.

FIG. 4 shows the state of the thermal management circuit 100 when heating the battery 173 according to the first embodiment. As shown in FIG. 4, the battery 173 is provided in a flow path 170*b* of the battery circuit 170. The battery 173 exchanges heat with the heat medium in the flow path 170*b*. The flow path 170*b* is in thermal contact with the battery 173. The flow path 170*b* is a flow path connecting the port P2 of the five-way valve 180 and the port P12 of the five-way valve 190. The flow path 170*b* is an example of the "first flow path" of the present disclosure.

The low temperature radiator 122 is provided in a flow path 130*a* of the low temperature circuit 130. The flow path 130*a* is a flow path connecting the port P5 of the five-way valve 180 and the port P15 of the five-way valve 190. The flow path 130*a* is an example of the "third flow path" of the present disclosure.

The water pump 131, the SPU 132, the PCU 133, the oil cooler 134, the buck-boost converter 135, and the reservoir tank 136 are provided in a flow path 130*b* of the low temperature circuit 130. The PCU 133, the oil cooler 134, etc. exchange heat with the heat medium in the flow path 130*b*. The flow path 130*b* is in thermal contact with the SPU 132, the PCU 133, the oil cooler 134, and the buck-boost converter 135. The flow path 130*b* is a flow path connecting the port P3 of the five-way valve 180 and the port P13 of the five-way valve 190. The flow path 130*b* is an example of the "second flow path" of the present disclosure.

The chiller 160 is provided in a flow path 170*a* of the battery circuit 170. The flow path 170*a* is a flow path connecting the port P1 of the five-way valve 180 and the port P11 of the five-way valve 190. The flow path 170*a* is an example of the "fourth flow path" of the present disclosure.

Communication Patterns

FIG. 4 shows an overview of a predetermined communication pattern (hereinafter sometimes referred to as "battery heating communication pattern") of the thermal management circuit 100 that is formed by controlling the five-way valves 180, 190. The battery heating communication pattern is an example of the "heating circuit" of the present disclosure.

Some electrified vehicles are not equipped with an engine. Therefore, there are cases where it is not possible to use engine waste heat to heat a component in an electrified vehicle that is to be heated. Accordingly, it is sometimes important to effectively use heat from a drive device including an inverter and a motor. It is also desired to efficiently perform self-heating of an electrical storage device. That is, it is desired to efficiently perform self-heating of the electrical storage device while allowing effective use of the heat generated by the drive device.

In the first embodiment, the ECU 500 sets the grille shutter 124 to the closed state and forms the battery heating communication pattern shown in FIG. 4 when heating the battery 173. In the battery heating communication pattern, the five-way valve 180 forms a path connecting the port P1 and the port P5 and a path connecting the port P2 and the port P3.

In the battery heating communication pattern, the five-way valve 190 forms a path connecting the port P11 and the port P12 and a path connecting the port P13 and the port P15.

As a result, a closed circuit 10 is formed. The closed circuit 10 has one heat medium path in which the heat medium circulates through the flow path 170*a*, the flow path 130*a*, the flow path 130*b*, and the flow path 170*b*.

When the battery 173 is used in the battery heating communication pattern shown in FIG. 4, heat from self-heating of the battery 173 is accumulated (stored) in the closed circuit 10. In this case, the chiller 160 does not perform heat exchange, but may perform heat exchange according to a heat request for air conditioning.

The PCU 133 and the transaxle (not shown) also generate heat during self-heating of the battery 173. The heat generated by the PCU 133 and the transaxle is accumulated (stored) in the closed circuit 10. Since the grille shutter 124 in the low temperature radiator 122 is set to the closed state, the heat accumulated in the closed circuit 10 is less likely to be dissipated in the low temperature radiator 122.

As a result, it is possible to efficiently perform self-heating of the battery 173 while allowing effective use of the heat generated by the drive device such as the PCU 133.

Method for Controlling Thermal Management Circuit

Figure 5:
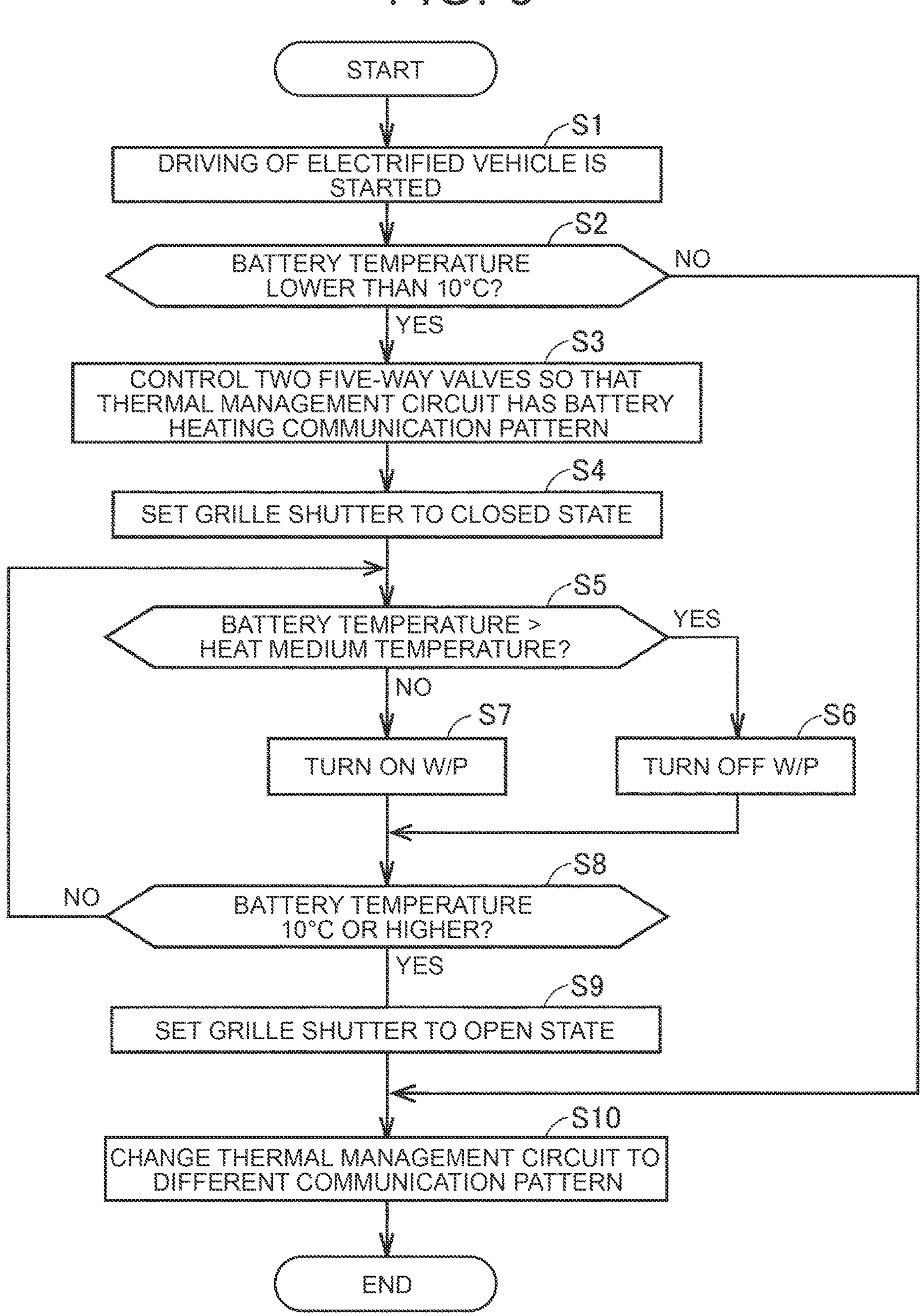
FIG. 5 is a flowchart showing a control that is performed by the thermal management system according to the first embodiment.

A control method of the thermal management system 1 will be described with reference to FIG. 5. FIG. 5 is a flowchart showing a control that is performed by the thermal management system 1 according to the first embodiment. The flow shown in FIG. 5 is merely illustrative, and the control in the present disclosure is not limited to the example shown in FIG. 5.

In step S1, driving of the electrified vehicle 1*a* is started (traction system is activated). Specifically, a start button, not shown, of the electrified vehicle 1*a* is pressed, so that the PCU 133 and the battery 173 are electrically connected by a system main relay (SMR), not shown. By receiving a predetermined internal signal in the electrified vehicle 1*a*, the ECU 500 detects that driving of the electrified vehicle 1*a* has been started.

In step S2, the ECU 500 determines whether the temperature of the battery 173 detected by the battery temperature sensor 175 is lower than 10° C. When the temperature of the battery 173 is lower than 10° C. (Yes in S2), the process proceeds to step S3. When the temperature of the battery 173 is equal to or higher than 10° C. (Yes in S2), the process proceeds to step S10. The threshold in step S2 may be a value other than 10° C.

In step S3, the ECU 500 controls the five-way valve 180 and the five-way valve 190 so that the thermal management circuit 100 has the battery heating communication pattern shown in FIG. 4.

In step S4, the ECU 500 sets the grille shutter 124 to the closed state. This reduces introduction of outside air into the low temperature radiator 122. As a result, the amount of heat that is exchanged with the outside air in the low temperature radiator 122 decreases compared to when the grille shutter 124 is in the open state.

In step S5, the ECU 500 determines whether the temperature of the battery 173 detected by the battery temperature sensor 175 is higher than the temperature of the heat medium flowing in the battery circuit 170 detected by the heat medium temperature sensor 176. When the temperature of the battery 173 is higher than the temperature of the heat medium (Yes in S5), the process proceeds to step S6. When the temperature of the battery 173 is equal to or lower than the temperature of the heat medium (No in S5), the process proceeds to step S7.

In step S6, the ECU 500 turns off the water pump 171. When the water pump 171 is already off, the ECU 500 keeps the water pump 171 off. This reduces dissipation of heat generated by the battery 173 to the heat medium. The process then proceeds to step S8.

In step S7, the ECU 500 turns on the water pump 171. When the water pump 171 is already on, the ECU 500 keeps the water pump 171 on. This allows the heat of the heat medium in the battery circuit 170 to be accumulated (stored) in the battery 173. The process then proceeds to step S8.

In step S8, the ECU 500 determines whether the temperature of the battery 173 detected by the battery temperature sensor 175 is equal to or higher than 10° C. When the temperature of the battery 173 is equal to or higher than 10° C. (Yes in S8), the process proceeds to step S9. When the temperature of the battery 173 is lower than 10° C. (No in S8), the process returns to step S5. The threshold in step S8 may be a value other than 10° C. as long as it is equal to or higher than the threshold in step S2.

In step S9, the ECU 500 sets the grille shutter 124 to the open state. This allows introduction of outside air into the low temperature radiator 122. As a result, the amount of heat that is exchanged with the outside air in the low temperature radiator 122 increases compared to when the grille shutter 124 is in the closed state.

In step S10, the ECU 500 controls the five-way valve 180 and the five-way valve 190 to change the communication pattern of the thermal management circuit 100 from the battery heating communication pattern shown in FIG. 4 to a different communication pattern (e.g., a communication pattern suitable for traveling of the electrified vehicle 1*a*). The process then ends.

As described above, in the first embodiment, the ECU 500 forms the closed circuit 10 having one heat medium path in which the heat medium circulates through the flow path 170*a*, the flow path 130*a*, the flow path 130*b*, and the flow path 170*b*, and also sets the grille shutter 124 to the closed state, when performing heating control of the battery 173. The heat generated by self-heating of the battery 173 can thus be stored in the closed circuit 10. The heat generated in the PCU 133 can also be stored in the closed circuit 10. As a result, it is possible to efficiently perform self-heating of the battery 173 while allowing effective use of the heat generated by the PCU 133. Since the flow path 130*b* is upstream of the flow path 170*b*, the battery 173 can be heated using the heat generated by the PCU 133.

When it is determined that there is a request to turn on the heater such as when a button for turning on the heater is pressed by a user of the electrified vehicle 1*a* or when the cabin temperature is lower than a set temperature, the compressor 151 is turned on when the water pump 171 is on. In this case, the heat from the battery 173 is supplied via the chiller 160 to the heater core 114 serving as an air conditioning circuit. On the other hand, the compressor 151 is stopped when the water pump 171 is off. In this case, only the heat in the high temperature circuit 110 is used for the heater of the electrified vehicle 1*a*. When there is no request to turn on the heater, the heater is turned off. Turning off the heater means turning off the water pump 111, the electric heater 112, etc.

Second Embodiment

The configuration using the five-way valves 180, 190 is described in the first embodiment. However, the configuration of the switching device according to the present disclosure is not limited to this. The configuration in which the switching device according to the present disclosure is an eight-way valve 280 will be described in a second embodiment.

Overall Configuration

FIG. 6 shows an example of the overall configuration of a thermal management system 2 according to the second embodiment. The thermal management system 2 is different from the thermal management system 1 (see FIG. 2) according to the first embodiment in that the thermal management system 2 includes a thermal management circuit 200 instead of the thermal management circuit 100 and includes an ECU 510 instead of the ECU 500.

The thermal management circuit 200 includes, for example, a chiller circuit 210, a chiller 220, a radiator circuit 230, a refrigeration cycle 240, a condenser 250, a drive unit circuit 260, a battery circuit 270, and an eight-way valve 280. The eight-way valve 280 is an example of the "switching device" of the present disclosure. The chiller 220 and the refrigeration cycle 240 are examples of the "chiller device" and the "air conditioning circuit" of the present disclosure, respectively.

The chiller circuit 210 includes a water pump (W/P) 211. The chiller 220 is connected to (shared by) both the chiller circuit 210 and the refrigeration cycle 240. The water pump 211 is an example of the "pump" of the present disclosure.

The radiator circuit 230 includes a radiator 231 and a grille shutter 232. The radiator 231 is provided with the grille shutter 232 (see FIG. 7). The refrigeration cycle 240 includes, for example, a compressor 241, an electromagnetic valve 242 (see FIG. 7), electromagnetic valves 244A, 244B, 245, and 246 (see FIG. 7), an evaporator 247, a check valve 248, and an accumulator 249. The condenser 250 includes a water-cooled condenser 251 and an air-cooled condenser 252 (see FIG. 7), and the water-cooled condenser 251 is connected to both the refrigeration cycle 240 and the radiator circuit 230.

The drive unit circuit 260 includes, for example, a water pump 261, an SPU 262, a PCU 263, an oil cooler 264, and a reservoir tank 265. Instead of the oil cooler 264, a transaxle may be provided in the drive unit circuit 260. The PCU 263 and the oil cooler 264 are examples of the "drive device" of the present disclosure. A system including the PCU 263, the oil cooler 264, and a battery 272 is an example of the "traction system" of the present disclosure.

The battery circuit 270 includes, for example, the battery 272, a battery temperature sensor 273, and a heat medium temperature sensor 274. The battery 272 is an example of the "electrical storage device" of the present disclosure. The battery temperature sensor 273 and the heat medium temperature sensor 274 are examples of the "first temperature sensor" and the "second temperature sensor" of the present disclosure, respectively.

The eight-way valve 280 includes eight ports P21 to P28 (see FIG. 7), and is connected to the chiller circuit 210, the radiator circuit 230, the drive unit circuit 260, and the battery circuit 270.

The ECU 510 controls the thermal management circuit 200. The ECU 510 includes a processor 511, a memory 512, a storage 513, and an interface 514.

Configuration of Thermal Management Circuit

Figure 7:
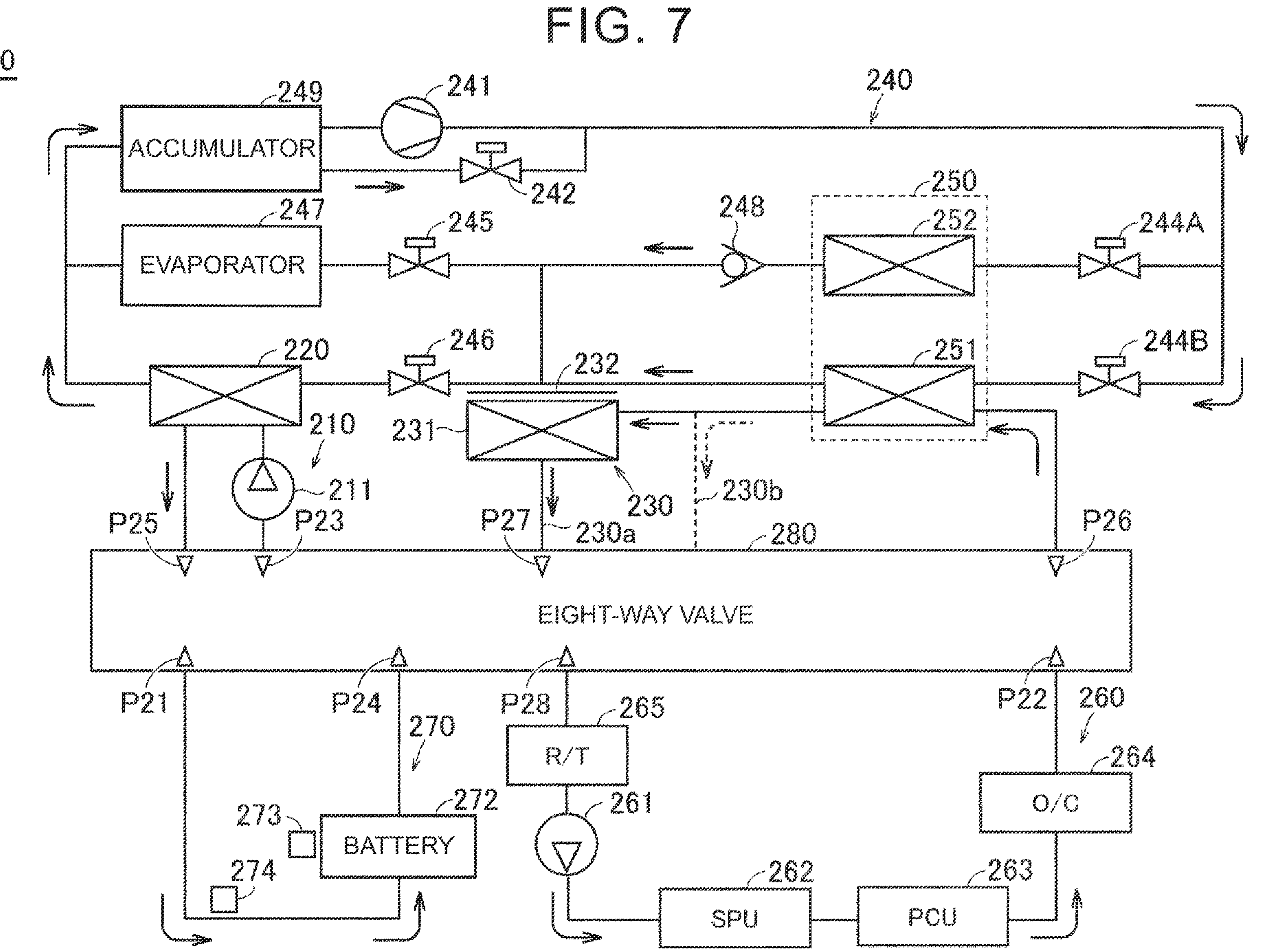
FIG. 7 shows an example of the configuration of a thermal management circuit according to the second embodiment.

FIG. 7 shows an example of the configuration of the thermal management circuit 200 according to the second embodiment. A heat medium circulating in the chiller circuit 210 flows through the following path: eight-way valve 280 (port P23)-water pump 211—chiller 220—eight-way valve 280 (port P25).

The water pump 211 circulates the heat medium in the chiller circuit 210 according to a control command from the ECU 510. The chiller 220 exchanges heat between the heat medium circulating in the chiller circuit 210 and the heat medium circulating in the refrigeration cycle 240. The eight-way valve 280 switches the path to which the chiller circuit 210 is connected according to a control command from the ECU 510. The switching of the path by the eight-way valve 280 will be discussed in detail later.

In the example shown in FIG. 7, the heat medium circulating in the radiator circuit 230 flows through the following path: eight-way valve (port P26)—water-cooled condenser 251—radiator 231—eight-way valve 280 (port P27). The radiator 231 is disposed downstream of the grille shutter 232, and exchanges heat between air outside the vehicle and the heat medium. Since the configuration of the grille shutter 232 is similar to the configuration of the grille shutter 124 in the first embodiment, detailed description thereof will not be repeated. The path of the heat medium circulating in the radiator circuit 230 may include the following path: eight-way valve (port P26)—water-cooled condenser 251—bypass flow path 230*b*—eight-way valve 280 (port P27).

The heat medium (gas-phase refrigerant or liquid-phase refrigerant) circulating in the refrigeration cycle 240 flows through a first path, a second path, a third path, or a fourth path. The first path is configured so that the heat medium flows through the following path: compressor 241—electromagnetic valve 244A—air-cooled condenser 252—check valve 248—electromagnetic valve (expansion valve) 245—evaporator 247—accumulator 249—compressor 241. The second path is configured so that the heat medium flows through the following path: compressor 241—electromagnetic valve 244A—air-cooled condenser 252—check valve 248—electromagnetic valve (expansion valve) 246—chiller 220—accumulator 249—compressor 241. The third path is configured so that the heat medium flows through the following path: compressor 241—electromagnetic valve 244B—water-cooled condenser 251—electromagnetic valve (expansion valve) 245—evaporator 247—accumulator 249—compressor 241. The fourth path is configured so that the heat medium flows through the following path: compressor 241—electromagnetic valve 244B—water-cooled condenser 251—electromagnetic valve 246—chiller 220—accumulator 249—compressor 241.

The compressor 241 compresses the gas-phase refrigerant circulating in the refrigeration cycle 240 according to a control command from the ECU 510. The electromagnetic valve 242 is connected in parallel with the compressor 241, and adjusts the amount of gas-phase refrigerant flowing into the compressor 241 according to a control command from the ECU 510. The electromagnetic valves 244A, 244B selectively allow the gas-phase refrigerant discharged from the compressor 241 to flow into either the water-cooled condenser 251 or the air-cooled condenser 252 according to a control command from the ECU 510. The water-cooled condenser 251 exchanges heat between the gas-phase refrigerant discharged from the compressor 241 and the heat medium flowing in the radiator circuit 230. The air-cooled condenser 252 exchanges heat with air introduced into a vehicle cabin to produce warm air. The electromagnetic valve 245 restricts the flow of the liquid-phase refrigerant into the evaporator 247 according to a control command from the ECU 510. The electromagnetic valve 246 restricts the flow of the liquid-phase refrigerant into the chiller 220 according to a control command from the ECU 510. The electromagnetic valves 245, 246 also have a function to expand the liquid-phase refrigerant. The accumulator 249 removes the liquid-phase refrigerant from the refrigerant in a gas-liquid mixed state. The accumulator 249 thus reduces or eliminates the possibility that the liquid-phase refrigerant may be sucked into the compressor 241 when the refrigerant is not completely evaporated by the evaporator 247.

The heat medium (coolant) circulating in the drive unit circuit 260 flows through the following path: eight-way valve 280 (port P28)—reservoir tank 265—water pump 261—SPU 262—PCU 263—oil cooler 264—eight-way valve 280 (port P22).

The water pump 261 circulates the heat medium in the drive unit circuit 260 according to a control command from the ECU 510. The SPU 262 controls charge and discharge of the battery 272 according to a control command from the ECU 510. The PCU 263 converts DC power supplied from the battery 272 to AC power to supply the AC power to a motor (not shown) contained in the transaxle according to a control command from the ECU 510. The oil cooler 264 cools the transaxle through heat exchange between the heat medium circulating in the drive unit circuit 260 and lubricating oil for the motor. Heat exchange may be performed between heat generated by supplying power to a stator without rotating a rotor of the motor and the heat medium circulating in the drive unit circuit 260.

The SPU 262, the PCU 263, and the oil cooler 264 are cooled by the heat medium circulating in the drive unit circuit 260. The reservoir tank 265 stores part of the heat medium circulating in the drive unit circuit 260 (heat medium that has overflowed due to a pressure increase) to maintain the pressure and amount of heat medium in the drive unit circuit 260.

The heat medium (coolant) circulating in the battery circuit 270 flows through the following path: eight-way valve 280 (port P21)—battery 272—eight-way valve 280 (port P24).

The battery 272 supplies traction power to the motor contained in the transaxle. The battery temperature sensor 273 detects the temperature of the battery 272. The heat medium temperature sensor 274 detects the temperature of the heat medium flowing in the battery circuit 270 (flow path 270*a* that will be described later).

Figure 8:
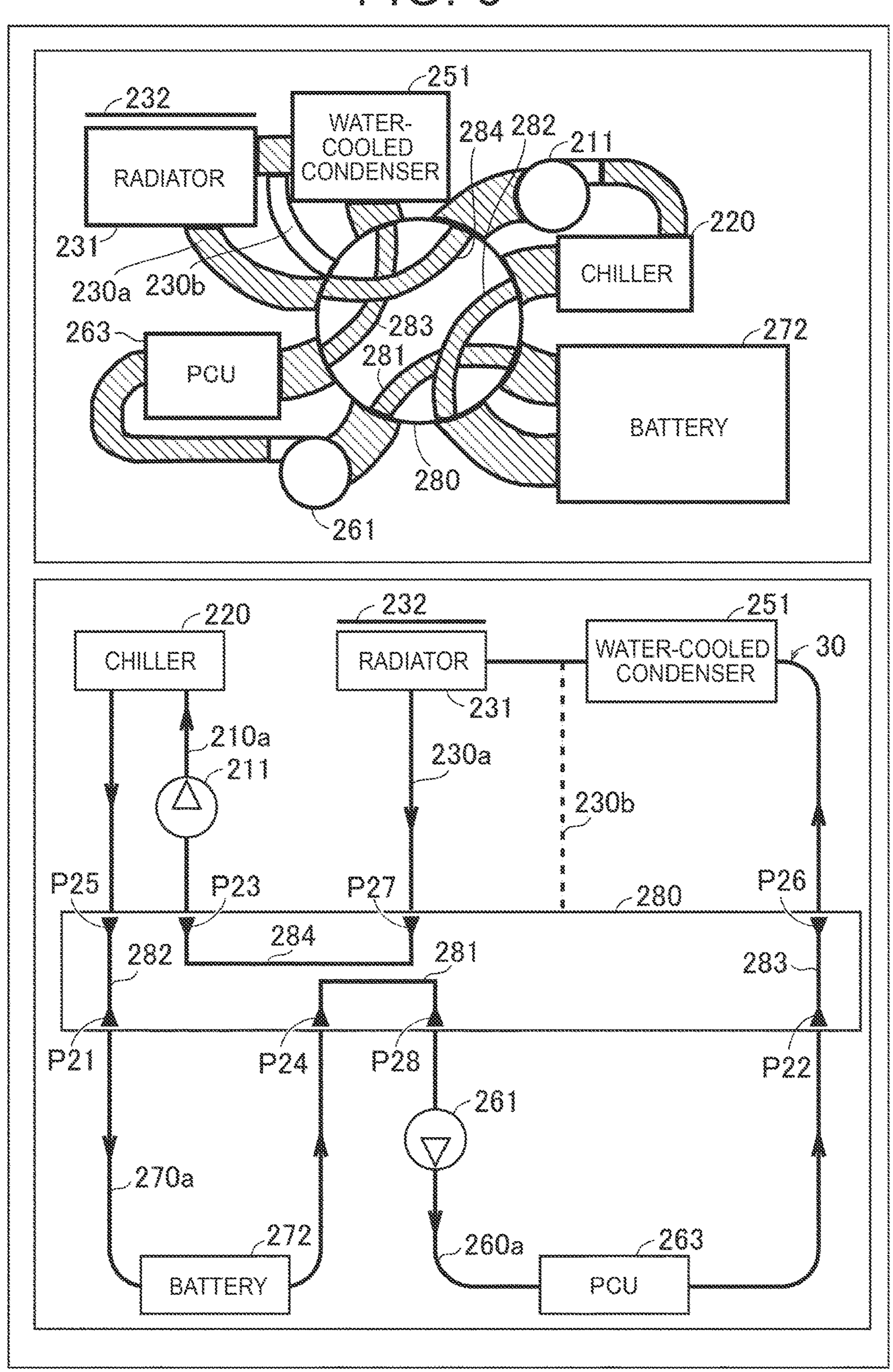
FIG. 8 shows the state of the thermal management circuit having a first communication pattern when heating a battery according to the second embodiment.

FIG. 8 shows the state of the thermal management circuit 200 having a first communication pattern when heating the battery 272 according to the second embodiment. The upper part of FIG. 8 shows an example of the state of the thermal management circuit 200 having the first communication pattern when heating the battery 272. The lower part of FIG. 8 shows a schematic configuration of the thermal management circuit 200.

As shown in the lower part of FIG. 8, the chiller 220 is provided in a flow path 210*a* of the chiller circuit 210. The flow path 210*a* is a flow path connecting the ports P23, P25 of the eight-way valve 280. The flow path 210*a* is an example of the "fourth flow path" of the present disclosure.

The radiator 231 is provided in a flow path 230*a* of the radiator circuit 230. The flow path 230*a* connects the radiator 231 and the eight-way valve 280. The flow path 230*a* is in parallel with the bypass flow path 230*b*. The bypass flow path 230*b* connects a portion between the water-cooled condenser 251 and the radiator 231 and the eight-way valve 280. When the heat medium flows through the bypass flow path 230*b*, the heat medium does not flow through the radiator 231 (flow path 230*a*). When the heat medium flows through the radiator 231 (flow path 230*a*), the heat medium does not flow through the bypass flow path 230*b*. The flow path 230*a* is an example of the "third flow path" of the present disclosure.

Of the water pump 261, the SPU 262, the PCU 263, the oil cooler 264, and the reservoir tank 265, only the water pump 261 and the PCU 263 are representatively shown in FIG. 8. The water pump 261, the SPU 262, the PCU 263, the oil cooler 264, and the reservoir tank 265 are provided in a flow path 260*a* (see the lower part of FIG. 8) of the drive unit circuit 260. The flow path 260*a* is a flow path connecting the ports P28, P22 of the eight-way valve 280. The flow path 260*a* is an example of the "second flow path" of the present disclosure.

The battery 272 is provided in the flow path 270*a* (see the lower part of FIG. 8) of the battery circuit 270. The flow path 270*a* is a flow path connecting the ports P21, P24 of the eight-way valve 280. The flow path 270*a* is an example of the "first flow path" of the present disclosure.

Communication Patterns

FIG. 8 shows an overview of the first communication pattern formed by the eight-way valve 280. In the first communication pattern, an internal flow path 281 of the eight-way valve 280 forms a path connecting the port P24 and the port P28. In the first communication pattern, an internal flow path 282 of the eight-way valve 280 forms a path connecting the port P21 and the port P25. In the first communication pattern, an internal flow path 283 of the eight-way valve 280 forms a path connecting the port P22 and the port P26. In the first communication pattern, an internal flow path 284 of the eight-way valve 280 forms a path connecting the port P23 and the port P27. In the first communication pattern, the flow path 230*a* is connected to the port P27 of the eight-way valve 280, and the bypass flow path 230*b* is blocked at its end.

As a result, a closed circuit 30 (see the lower part of FIG. 8) is formed. The closed circuit 30 has one heat medium path in which the heat medium circulates through the flow path 230*a* where the radiator 231 is provided, the flow path 210*a* where the chiller 220 is provided, the flow path 270*a* where the battery 272 etc. are provided, and the flow path 260*a* where the PCU 263 etc. are provided. As a result, the heat medium flows through the following path: radiator 231—eight-way valve 280—chiller 220—eight-way valve 280—battery 272—eight-way valve 280—PCU 263—eight-way valve 280—water-cooled condenser 251. The closed circuit 30 formed by the first communication pattern is an example of the "heating circuit" of the present disclosure.

As shown in the upper part of FIG. 8, the eight-way valve 280 has a circular shape as viewed perpendicularly to the plane of the paper. The eight-way valve 280 includes a rotating element inside a housing. The rotating element has the internal flow paths 281, 282, 283, and 284 and is rotatable clockwise or counterclockwise by an actuator (not shown).

When the actuator is driven according to a control command from the ECU 510, the rotating element rotates to change the connection of each port. The communication pattern of the thermal management circuit 200 is thus changed.

Method for Controlling Thermal Management Circuit

Figure 9:
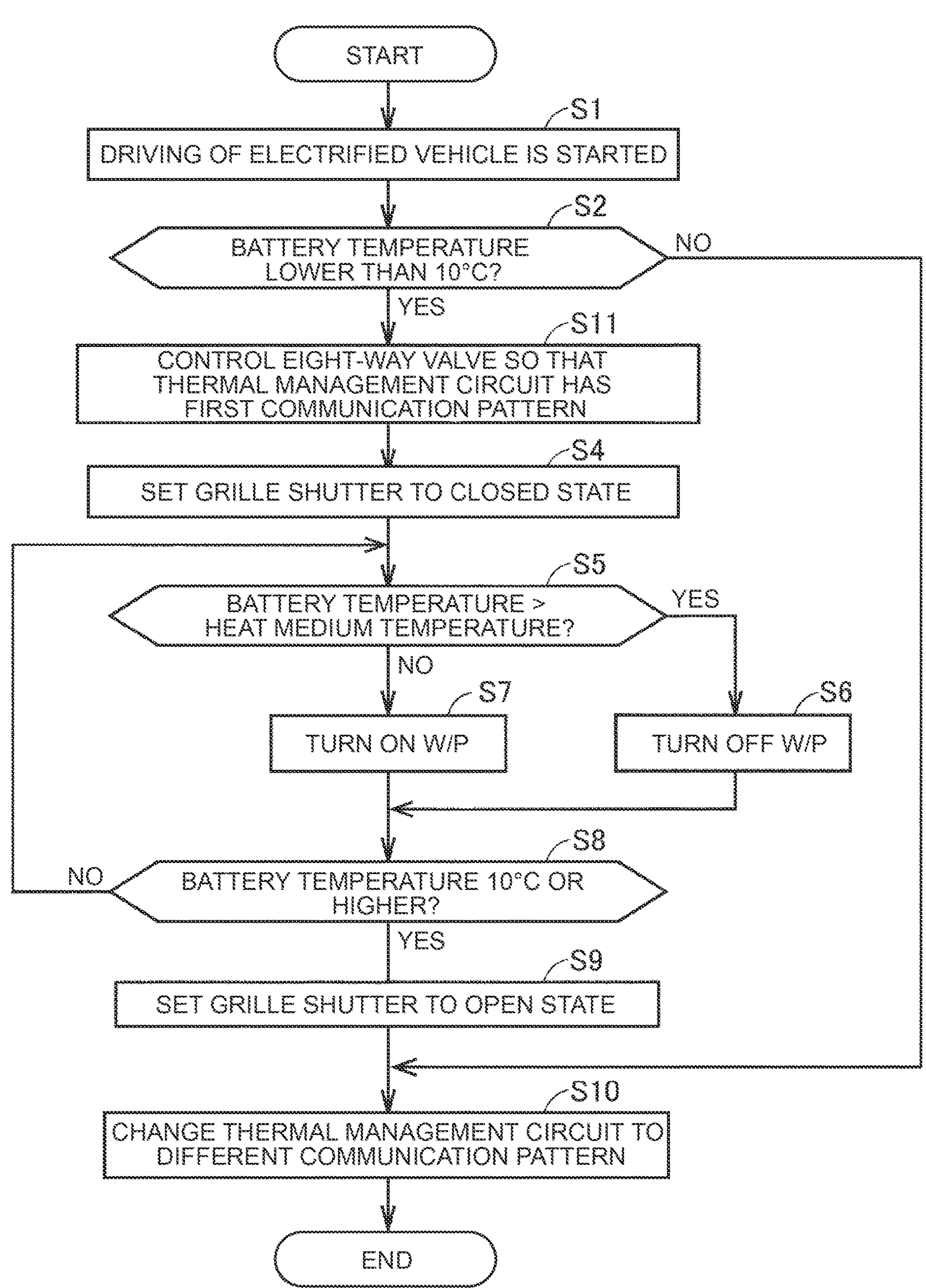
FIG. 9 is a flowchart showing a control that is performed by the thermal management system according to the second embodiment.

A control method of the thermal management system 2 will be described with reference to FIG. 9. FIG. 9 is a flowchart showing a control that is performed by the thermal management system 2 according to the second embodiment. The flow shown in FIG. 9 is merely illustrative, and the control in the present disclosure is not limited to the example shown in FIG. 9. Description of the same steps as those in the control flow of the first embodiment will be simplified or omitted.

When the ECU 510 determines in step S2 that the temperature of the battery 272 detected by the battery temperature sensor 273 is lower than 10° C. (Yes in S2), the process proceeds to step S11. When the temperature of the battery 272 is equal to or higher than 10° C. (No in S2), the process proceeds to step S10.

In step S11, the ECU 510 controls the eight-way valve 280 so that the thermal management circuit 200 has the first communication pattern shown in FIG. 8. Specifically, the ECU 510 controls the actuator to rotate the rotating element of the eight-way valve 280 to a position that forms the first communication pattern. The process then proceeds to step S4.

Other configurations and effects of the second embodiment are the same as those of the first embodiment.

The second embodiment illustrates an example in which the eight-way valve 280 is controlled to form the first communication pattern when heating the battery 272. However, the method for controlling the eight-way valve 280 is not limited to forming the first communication pattern, and the eight-way valve 280 may be controlled to form a second communication pattern described below.

Figure 10:
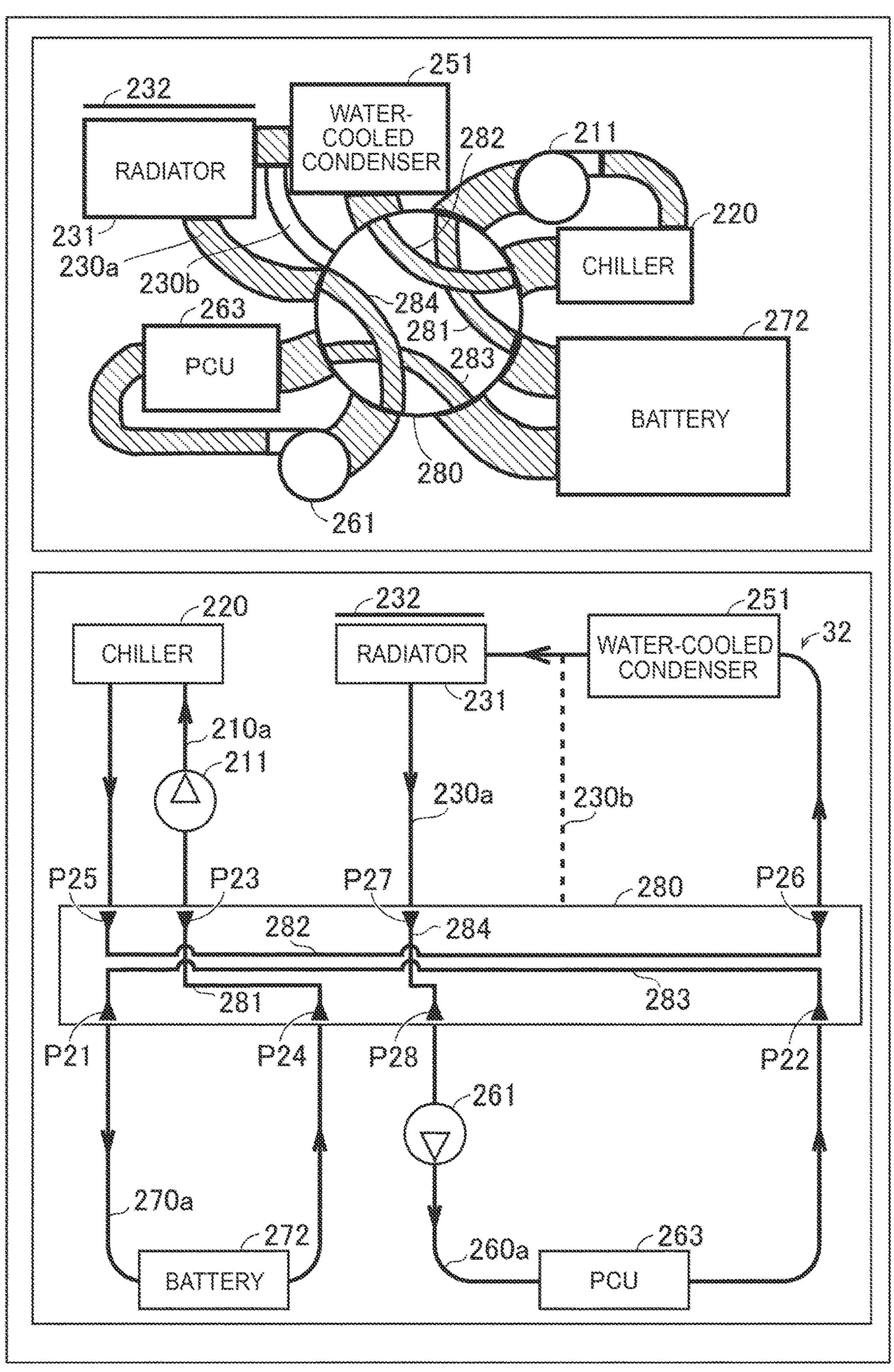
FIG. 10 shows the state of the thermal management circuit having a second communication pattern when heating the battery according to the second embodiment.

FIG. 10 shows the state of the thermal management circuit 200 having a second communication pattern when heating the battery 272 according to the second embodiment. The upper part of FIG. 10 shows an example of the state of the thermal management circuit 200 having the second communication pattern when heating the battery 272. The lower part of FIG. 10 shows a schematic configuration of the thermal management circuit 200.

The upper part of FIG. 10 shows the eight-way valve 280 with the rotating element rotated by a predetermined angle from the state shown in the upper part of FIG. 8.

In the second communication pattern (see FIG. 10), the internal flow path 281 of the eight-way valve 280 forms a path connecting the port P23 and the port P24. In the second communication pattern, the internal flow path 282 of the eight-way valve 280 forms a path connecting the port P25 and the port P26. In the second communication pattern, the internal flow path 283 of the eight-way valve 280 forms a path connecting the port P21 and the port P22. In the second communication pattern, the internal flow path 284 of the eight-way valve 280 forms a path connecting the port P27 and the port P28.

As a result, a closed circuit 32 (see the lower part of FIG. 10) is formed. The closed circuit 32 has one heat medium path in which the heat medium circulates through the flow path 230*a* where the radiator 231 is provided, the flow path 260*a* where the PCU 263 etc. are provided, the flow path 270*a* where the battery 272 etc. are provided, and the flow path 210*a* where the chiller 220 is provided. As a result, the heat medium flows through the following path: radiator 231—eight-way valve 280—PCU 263—eight-way valve 280—battery 272—eight-way valve 280—chiller 220—eight-way valve 280—water-cooled condenser 251.

The closed circuit 32 formed by the second communication pattern is an example of the "heating circuit" of the present disclosure.

The above configuration also has the effects of the second embodiment described above. Since the flow path 260*a* is upstream of the flow path 270*a,* the battery 272 can be heated using the heat generated by the PCU 263.

The communication pattern may be switched between the first communication pattern (see FIG. 8) and the second communication pattern (see FIG. 10) by rotating the eight-way valve 280. The ECU 510 may set either the first communication pattern or the second communication pattern as a communication pattern to be formed at the start of heating the battery 272, according to, for example, the temperature of the battery 272, the temperature of the PCU 263, whether the heater is on or off, or the operating state of the water pump 211 or the water pump 261. Alternatively, the ECU 510 may switch the communication pattern from one of the first and second communication patterns to the other communication pattern based on conditions such as the state of the battery 272 during heating and the heating time.

Third Embodiment

Although the second embodiment uses the eight-way valve 280, a third embodiment uses two six-way valves as a switching device. The same components as those of the second embodiment are denoted by the same signs as those of the second embodiment, and description thereof will not be repeated.

Overall Configuration

FIG. 11 shows an example of the overall configuration of a thermal management system 3 according to the third embodiment. The thermal management system 3 is different from the thermal management system 2 (see FIG. 6) according to the second embodiment in that the thermal management system 3 includes a thermal management circuit 300 instead of the thermal management circuit 200 and includes an ECU 520 instead of the ECU 510.

The thermal management circuit 300 includes the chiller circuit 210, the chiller 220, the radiator circuit 230, the refrigeration cycle 240, the condenser 250, the drive unit circuit 260, the battery circuit 270, a six-way valve 380, and a six-way valve 390. Each of the six-way valves 380, 390 is an example of the "switching device" of the present disclosure.

The chiller 220 is provided in a flow path 210*b* of the chiller circuit 210. The flow path 210*b* connects the chiller circuit 210 and each of the six-way valves 380, 390. The flow path 210*b* is an example of the "fourth flow path" of the present disclosure.

The radiator 231 is provided in a flow path 230*c*. The radiator 231 is provided with the grille shutter 232. The flow path 230*c* connects the radiator 231 and the six-way valve 390. The flow path 230*c* is an example of the "third flow path" of the present disclosure.

The water pump 261, the SPU 262, the PCU 263, the oil cooler 264, and the reservoir tank 265 are provided in a flow path 260*b* of the drive unit circuit 260. The flow path 260*b* connects the drive unit circuit 260 and each of the six-way valves 380, 390. The flow path 260*b* is an example of the "second flow path" of the present disclosure.

The battery 272 is provided in a flow path 270*b* of the battery circuit 270. The flow path 270*b* connects the battery circuit 270 and the six-way valve 380. The flow path 270*b* is an example of the "first flow path" of the present disclosure.

The ECU 520 controls the thermal management circuit 300. The ECU 520 includes a processor 521, a memory 522, a storage 523, and an interface 524.

Configuration of Thermal Management Circuit

Figure 12:
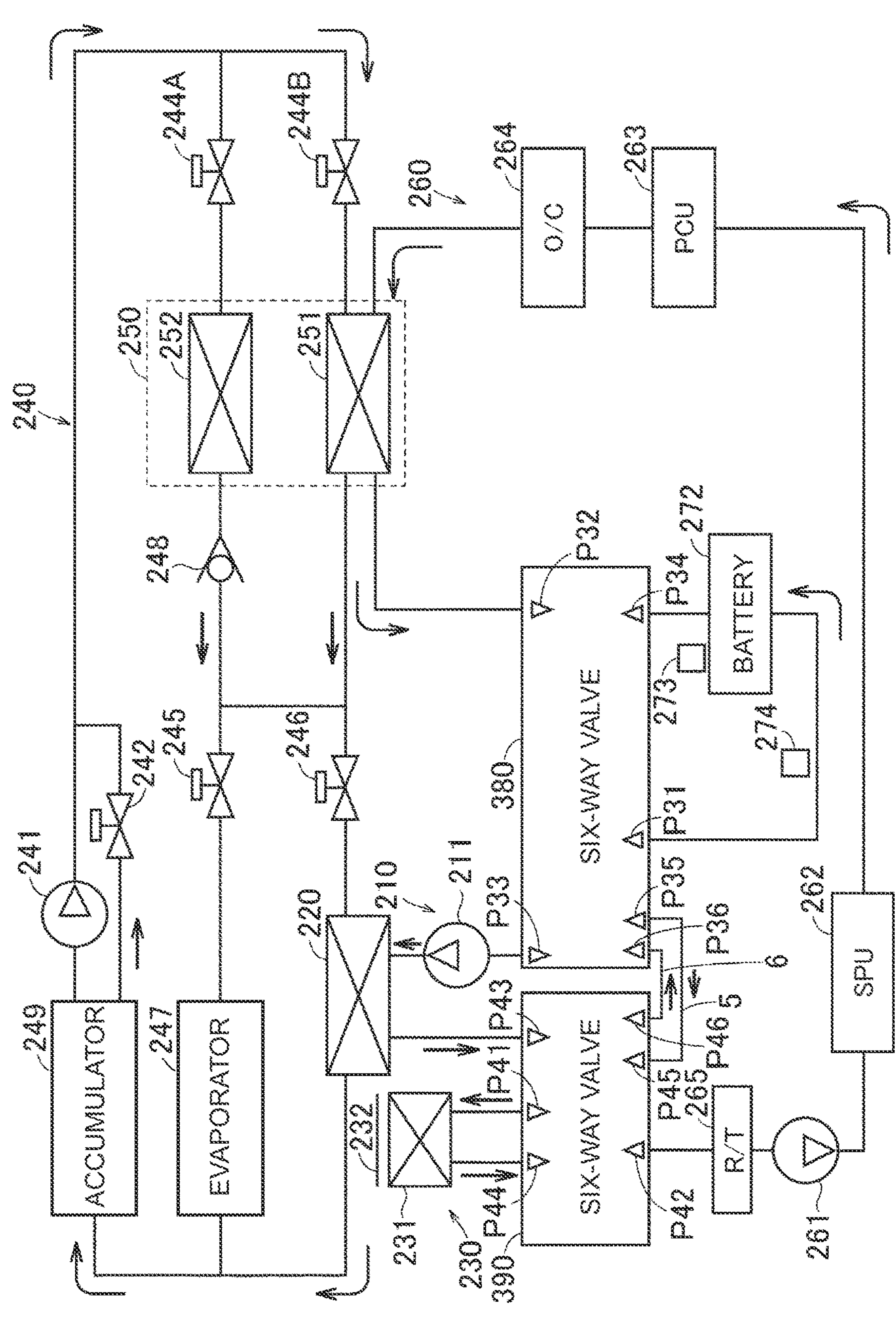
FIG. 12 shows an example of the configuration of a thermal management circuit according to the third embodiment.

FIG. 12 shows an example of the configuration of the thermal management circuit 300 according to the third embodiment. As shown in FIG. 12, the six-way valve 380 includes six ports P31 to P36. The six-way valve 390 includes six ports P41 to P46.

The six-way valve 380 is connected to the six-way valve 390. Specifically, the port P35 of the six-way valve 380 and the port P45 of the six-way valve 390 are connected by a flow path 5. The port P36 of the six-way valve 380 and the port P46 of the six-way valve 390 are connected by a flow path 6.

A heat medium circulating in the chiller circuit 210 flows through the following path: six-way valve 380 (port P33)—water pump 211—chiller 220—six-way valve 390 (port P43).

The heat medium circulating in the radiator circuit 230 flows through the following path: six-way valve 390 (port P41)—radiator 231—six-way valve 390 (port P44).

The heat medium (coolant) circulating in the drive unit circuit 260 flows through the following path: six-way valve 390 (port P42)—reservoir tank 265—water pump 261—SPU 262—PCU 263—oil cooler 264—water-cooled condenser 251—six-way valve 380 (port P32).

The heat medium (coolant) circulating in the battery circuit 270 flows through the following path: six-way valve 380 (port P31)-battery 272—six-way valve 380 (port P34).

Communication Patterns

Figure 13:
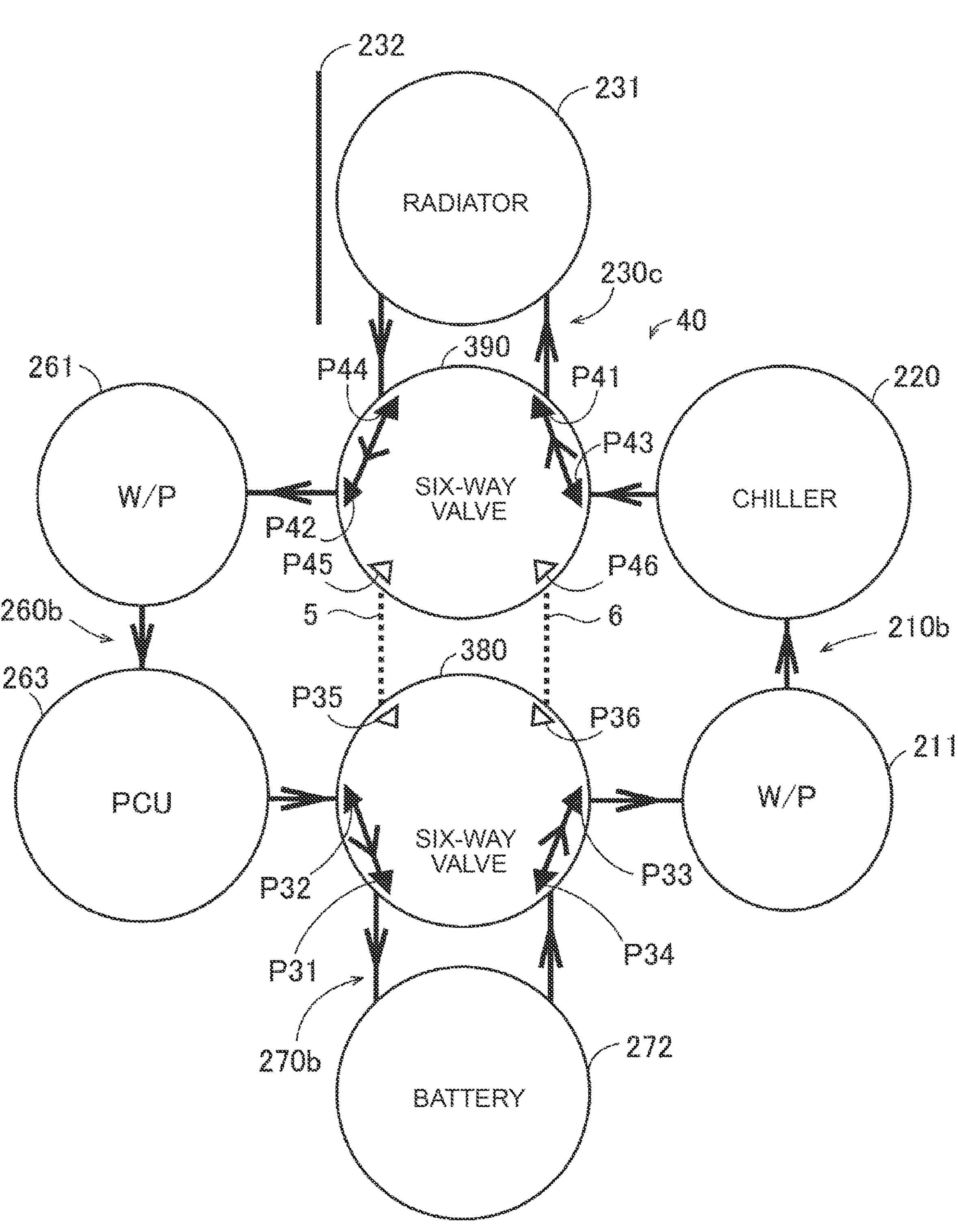
FIG. 13 shows the state of the thermal management circuit having a first communication pattern when heating a battery according to the third embodiment.

FIG. 13 shows the state of the thermal management circuit 300 having a first communication pattern when heating the battery 272. FIG. 13 shows an overview of the first communication pattern of the thermal management circuit 300 that is formed by controlling the six-way valves 380, 390. In the first communication pattern shown in FIG. 13, the six-way valve 380 forms a path connecting the port P31 and the port P32 and a path connecting the port P33 and the port P34.

In the first communication pattern shown in FIG. 13, the six-way valve 390 forms a path connecting the port P42 and the port P44 and a path connecting the port P41 and the port P43.

As a result, a closed circuit 40 is formed. The closed circuit 40 has one heat medium path in which the heat medium circulates through the flow path 230*c* where the radiator 231 is provided, the six-way valve 390, the flow path 260*b* where the PCU 263 etc. are provided, the six-way valve 380, the flow path 270*b* where the battery 272 etc. are provided, and the flow path 210*b* where the chiller 220 etc. are provided. The closed circuit 40 formed by the first communication pattern is an example of the "heating circuit" of the present disclosure.

Method for Controlling Thermal Management Circuit

Figure 14:
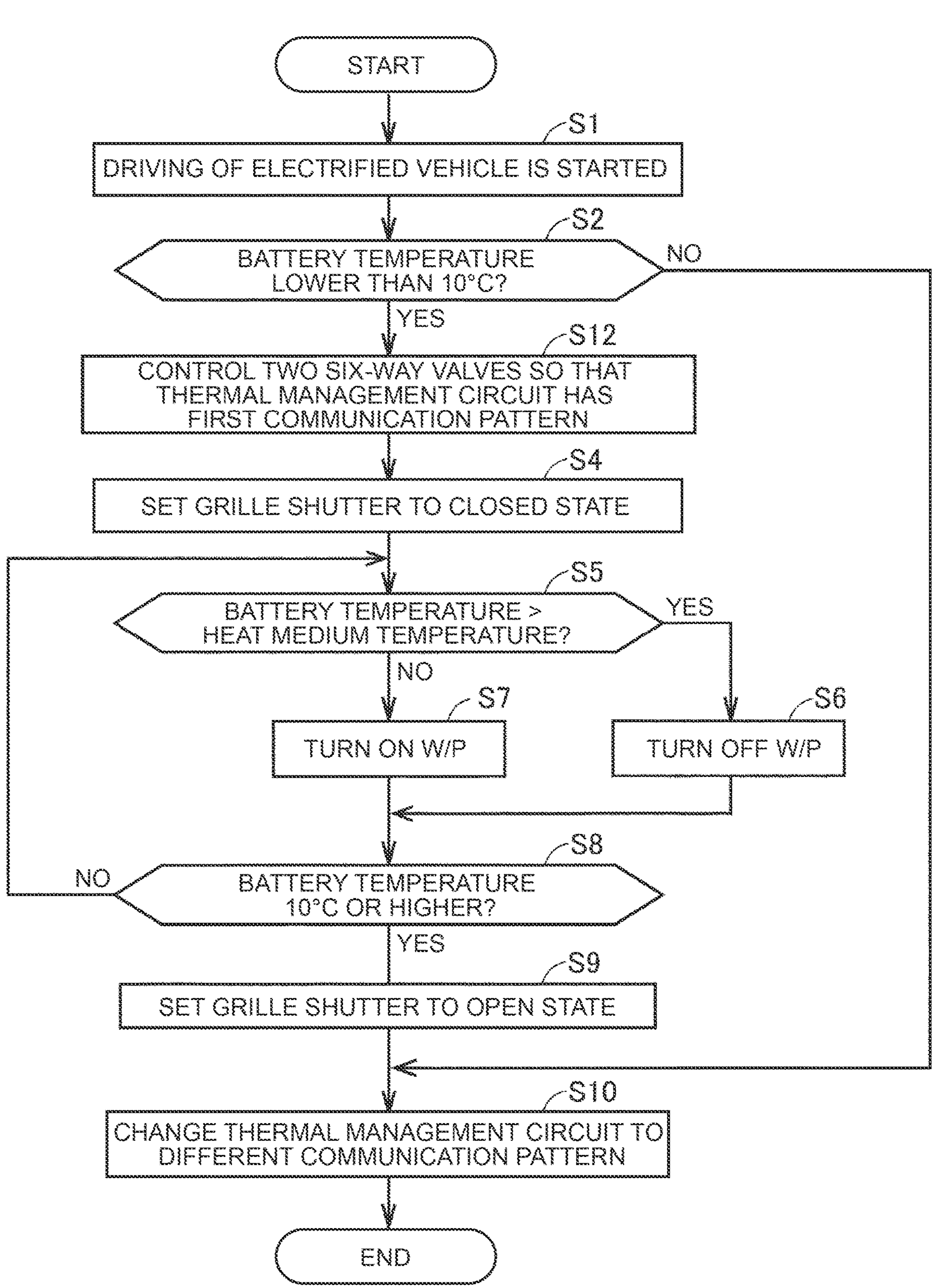
FIG. 14 is a flowchart showing a control that is performed by the thermal management system according to the third embodiment.

A control method of the thermal management system 3 will be described with reference to FIG. 14. FIG. 14 is a flowchart showing a control that is performed by the thermal management system 3 according to the third embodiment. The flow shown in FIG.

14 is merely illustrative, and the control in the present disclosure is not limited to the example shown in FIG. 14. Description of the same steps as those in the control flow of the second embodiment will be simplified or omitted.

When the ECU 520 determines in step S2 that the temperature of the battery 272 detected by the battery temperature sensor 273 is lower than 10° C. (Yes in S2), the process proceeds to step S12. When the temperature of the battery 272 is equal to or higher than 10° C. (No in S2), the process proceeds to step S10.

In step S12, the ECU 520 controls the six-way valve 380 and the six-way valve 390 so that the thermal management circuit 300 has the first communication pattern shown in FIG. 13. The process then proceeds to S4.

In step S10, the ECU 520 controls the six-way valve 380 and the six-way valve 390 to change the communication pattern of the thermal management circuit 300 from the first communication pattern shown in FIG. 13 to a different communication pattern (e.g., a communication pattern suitable for traveling of the electrified vehicle 1*a*). The process then ends.

Other configurations and effects of the third embodiment are the same as those of the second embodiment. Since the flow path 260*b* is upstream of the flow path 270*b*, the battery 272 can be heated using the heat generated by the PCU 263.

The third embodiment illustrates an example in which the six-way valves 380, 390 are controlled to form the first communication pattern when heating the battery 272. However, the method for controlling the six-way valves 380, 390 is not limited to forming the first communication pattern, and the six-way valves 380, 390 may be controlled to form a second communication pattern or a third communication pattern that will be described below instead of the first communication pattern.

Figure 15:
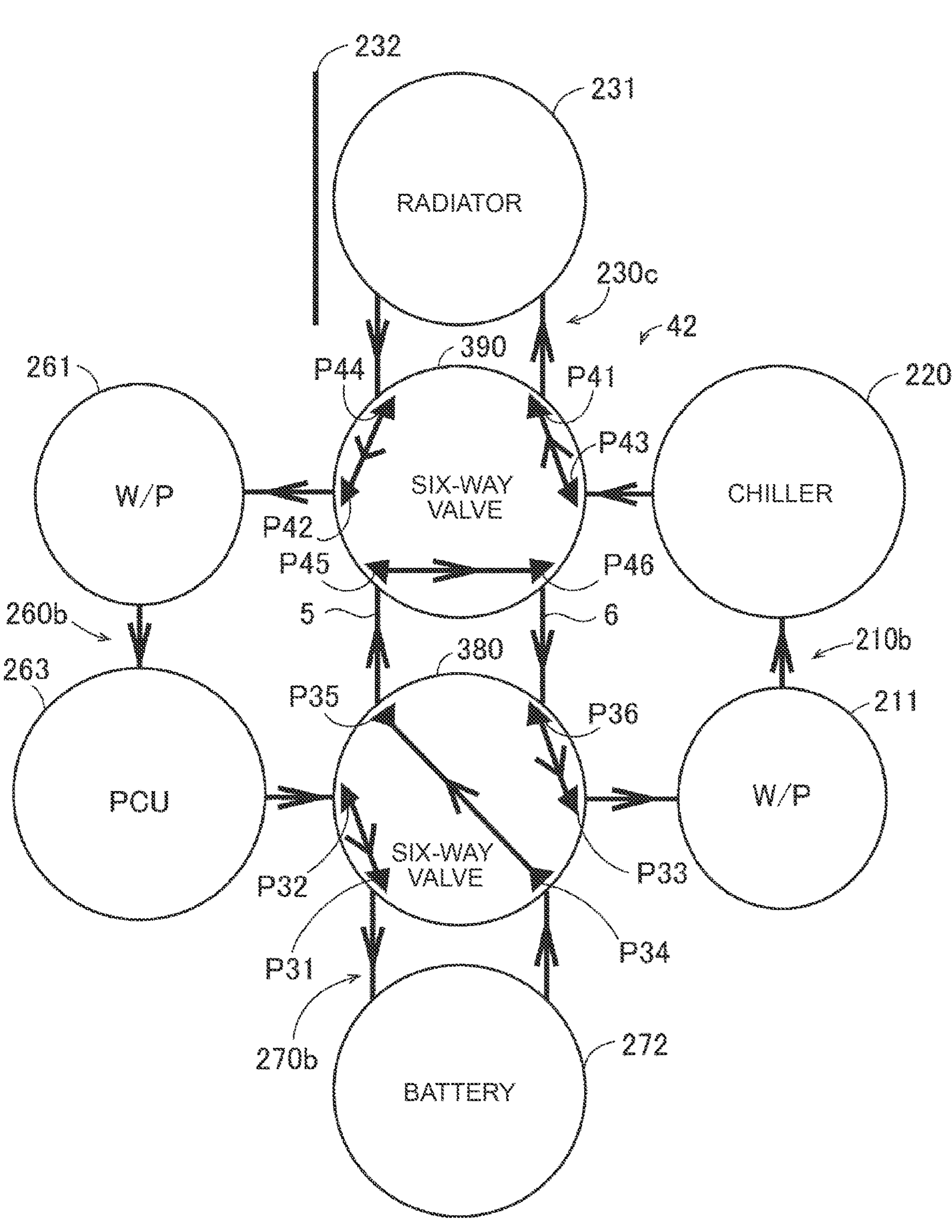
FIG. 15 shows the state of the thermal management circuit having a second communication pattern when heating the battery according to the third embodiment.

FIG. 15 shows the state of the thermal management circuit 300 having a second communication pattern when heating the battery 272 according to the third embodiment. FIG. 15 shows an overview of the second communication pattern of the thermal management circuit 300 that is formed by controlling the six-way valves 380, 390.

In the second communication pattern shown in FIG. 15, the six-way valve 380 forms a path connecting the port P31 and the port P32, a path connecting the port P33 and the port P36, and a path connecting the port P34 and the port P35.

In the second communication pattern shown in FIG. 15, the six-way valve 390 forms a path connecting the port P41 and the port P43, a path connecting the port P42 and the port P44, and a path connecting the port P45 and the port P46.

As a result, a closed circuit 42 is formed. The closed circuit 42 has one heat medium path in which the heat medium flows through the following paths: the flow path 230*c* where the radiator 231 etc. are provided, the six-way valve 390 (P44-P42), the flow path 260*b* where the PCU 263 etc. are provided, the six-way valve 380 (P32-P31), the flow path 270*b* where the battery 272 etc. are provided, the six-way valve 380 (P34-P35), the flow path 5, the six-way valve 390 (P45-P46), the flow path 6, the six-way valve 380 (P36-P33), the flow path 210*b* where the chiller 220 etc. are provided, and the six-way valve 390 (P43-P41). The closed circuit 42 formed by the second communication pattern is an example of the "heating circuit" of the present disclosure.

Figure 16:
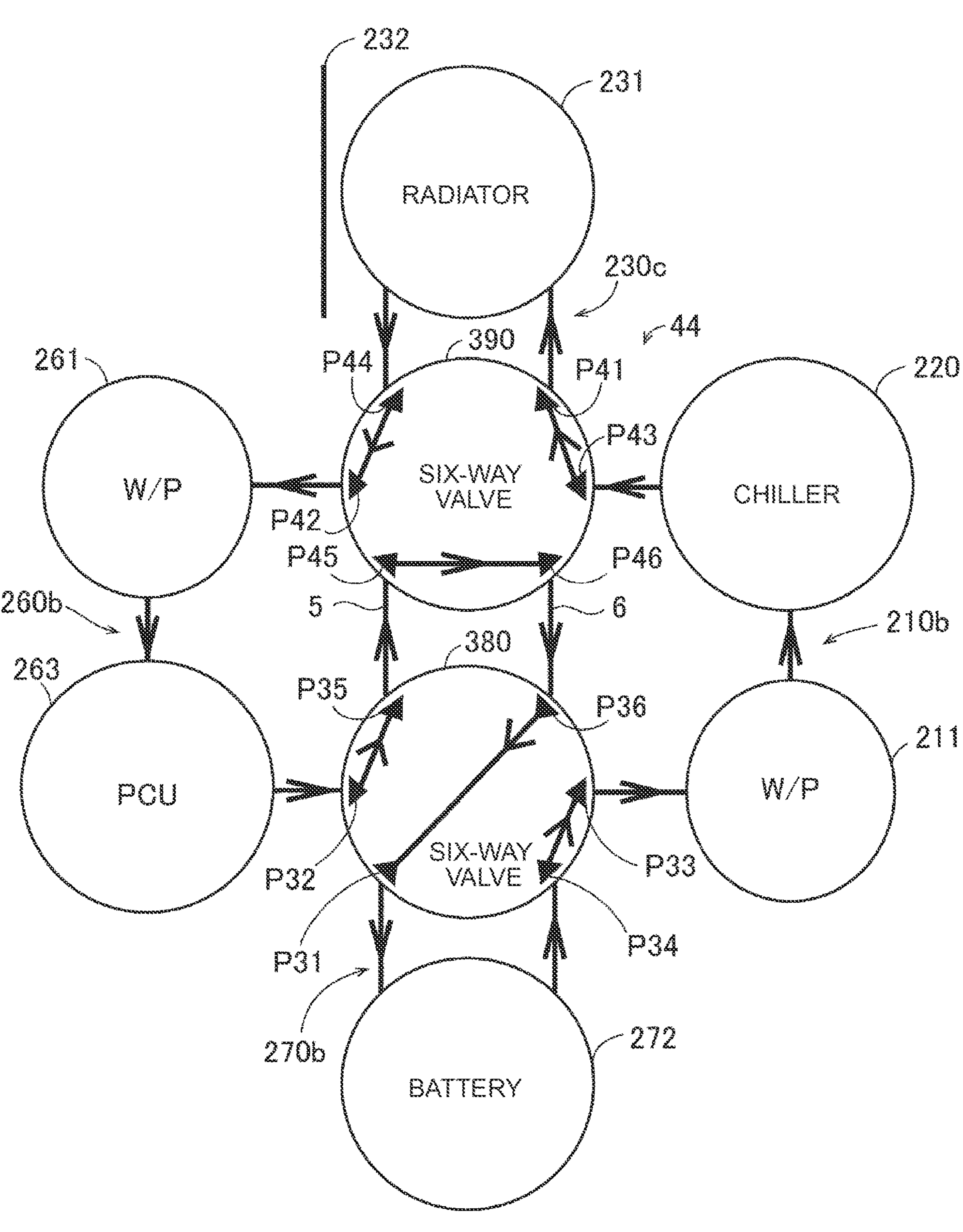
FIG. 16 shows the state of the thermal management circuit having a third communication pattern when heating the battery according to the third embodiment.

FIG. 16 shows the state of the thermal management circuit 300 having a third communication pattern when heating the battery 272 according to the third embodiment. FIG. 16 shows an overview of the third communication pattern of the thermal management circuit 300 that is formed by controlling the six-way valves 380, 390.

In the third communication pattern shown in FIG. 16, the six-way valve 380 forms a path connecting the port P31 and the port P36, a path connecting the port P32 and the port P35, and a path connecting the port P33 and the port P34.

In the third communication pattern shown in FIG. 16, the six-way valve 390 forms a path connecting the port P41 and the port P43, a path connecting the port P42 and the port P44, and a path connecting the port P45 and the port P46.

As a result, a closed circuit 44 is formed. The closed circuit 44 has one heat medium path in which the heat medium flows through the following paths: the flow path 230*c* where the radiator 231 etc. are provided, the six-way valve 390 (P44-P42), the flow path 260*b* where the PCU 263 etc. are provided, the six-way valve 380 (P32-P35), the flow path 5, the six-way valve 390 (P45-P46), the flow path 6, the six-way valve 380 (P36-P31), the flow path 270*b* where the battery 272 etc. are provided, the six-way valve 380 (P34-P33), the flow path 210*b* where the chiller 220 etc. are provided, and the six-way valve 390 (P43-P41). The closed circuit 44 formed by the third communication pattern is an example of the "heating circuit" of the present disclosure.

The above configuration also has the effects of the third embodiment described above. The communication pattern may be switched between the first communication pattern and the second communication pattern by controlling the six-way valves 380, 390. The ECU 520 may set the first communication pattern, the second communication pattern, or the third communication pattern as a communication pattern to be formed at the start of heating the battery 272, according to, for example, the total amount of circulating heat medium, the temperature of the battery 272, the temperature of the PCU 263, whether the heater is on or off, or the operating state of the water pump 211 or the water pump 261. Alternatively, the ECU 520 may switch the communication pattern from one of the first to third communication patterns to another one of the first to third communication patterns based on conditions such as the state of the battery 272 during heating and the heating time.

Although the third embodiment uses the six-way valves 380, 390, a fourth embodiment uses a ten-way valve as a switching device. The same components as those of the third embodiment are denoted by the same signs as those of the third embodiment, and description thereof will not be repeated.

Overall Configuration

Figure 17:
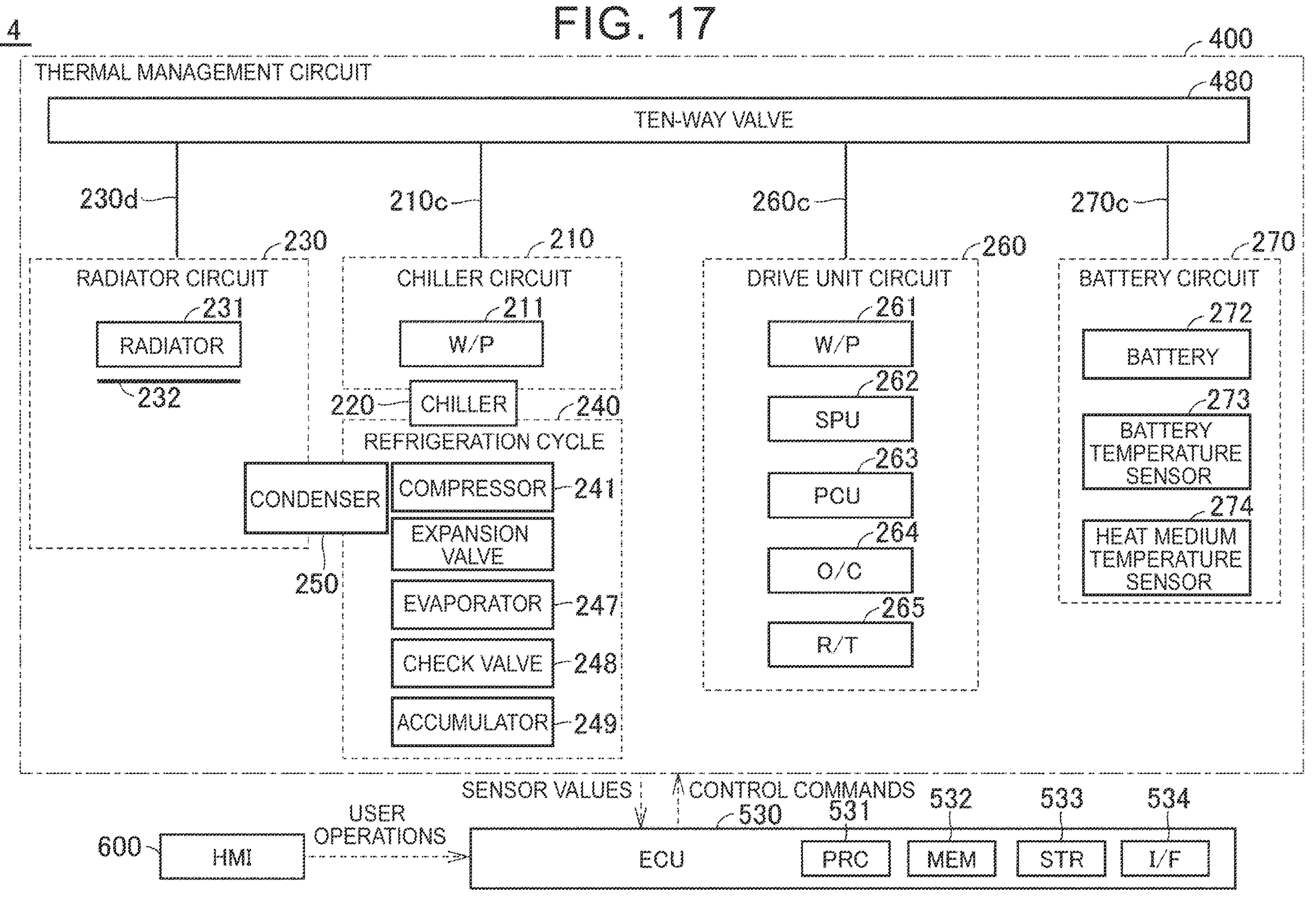
FIG. 17 shows an example of the overall configuration of a thermal management system according to a fourth embodiment.

FIG. 17 shows an example of the overall configuration of a thermal management system 4 according to the fourth embodiment. The thermal management system 4 is different from the thermal management system 3 (see FIG. 11) according to the third embodiment in that the thermal management system 4 includes a thermal management circuit 400 instead of the thermal management circuit 300 and includes an ECU 530 instead of the ECU 520.

The thermal management circuit 400 includes the chiller circuit 210, the chiller 220, the radiator circuit 230, the refrigeration cycle 240, the condenser 250, the drive unit circuit 260, the battery circuit 270, a ten-way valve 480. The ten-way valve 480 is an example of the "switching device" of the present disclosure.

The chiller 220 is provided in a flow path 210*c* of the chiller circuit 210. The flow path 210*c* connects the chiller circuit 210 and the ten-way valve 480. The flow path 210*c* is an example of the "fourth flow path" of the present disclosure.

The radiator 231 is provided in a flow path 230*d*. The radiator 231 is provided with the grille shutter 232. The flow path 230*d* connects the radiator 231 and the ten-way valve 480. The flow path 230*d* is an example of the "third flow path" of the present disclosure.

The water pump 261, the SPU 262, the PCU 263, the oil cooler 264, and the reservoir tank 265 are provided in a flow path 260*c* of the drive unit circuit 260. The flow path 260*c* connects the drive unit circuit 260 and the ten-way valve 480. The flow path 260*c* is an example of the "second flow path" of the present disclosure.

The battery 272 is provided in a flow path 270*c* of the battery circuit 270. The flow path 270*c* connects the battery circuit 270 and the ten-way valve 480. The flow path 270*c* is an example of the "first flow path" of the present disclosure.

The ECU 530 controls the thermal management circuit 400. The ECU 530 includes a processor 531, a memory 532, a storage 533, and an interface 534.

Configuration of Thermal Management Circuit

Figure 18:
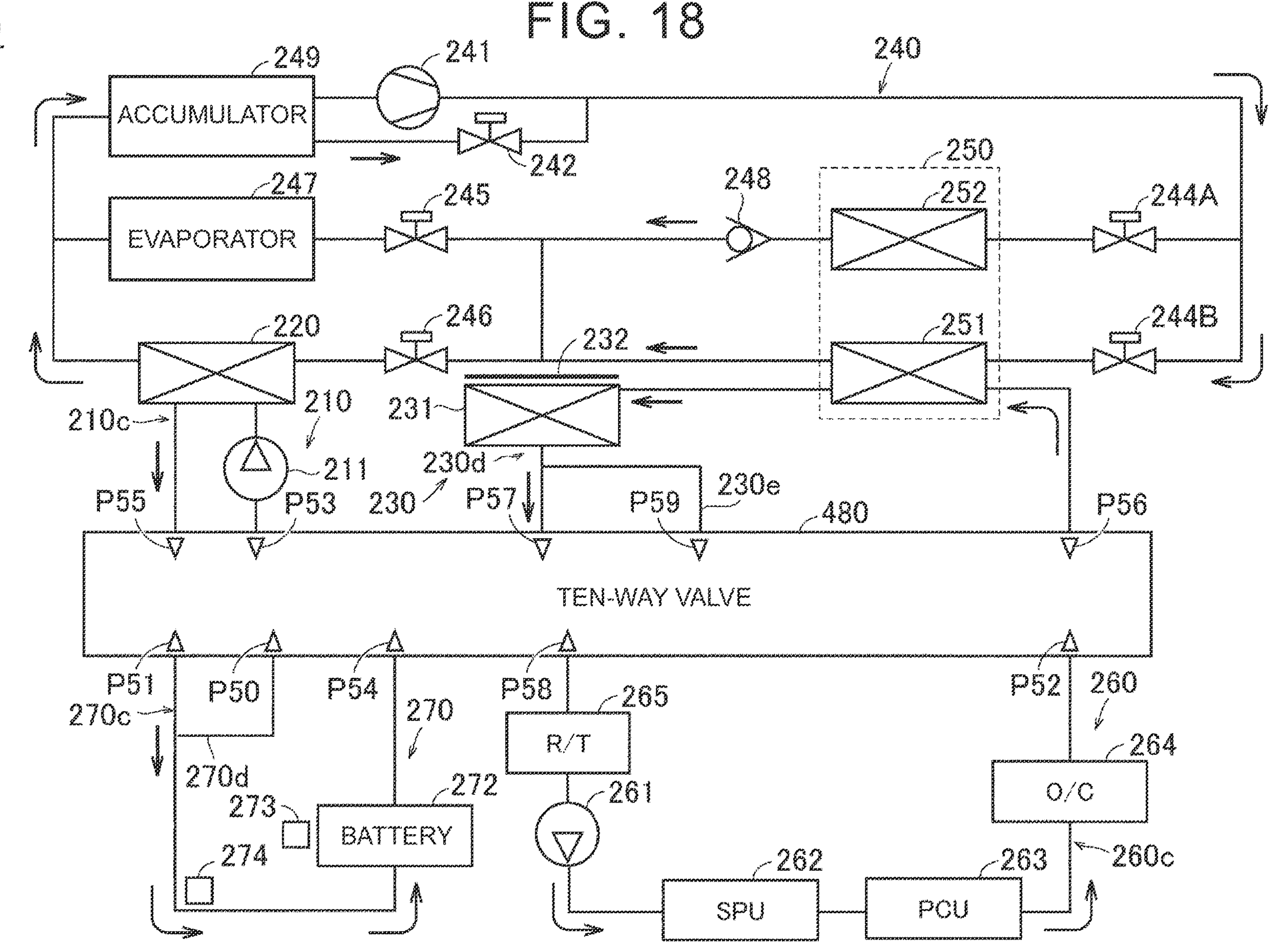
FIG. 18 shows an example of the configuration of a thermal management circuit according to the fourth embodiment.

FIG. 18 shows an example of the configuration of the thermal management circuit 400 according to the fourth embodiment. As shown in FIG. 18, the ten-way valve 480 includes six ports P50 to P59.

A heat medium circulating in the chiller circuit 210 flows through the following path: ten-way valve 480 (port P53)—water pump 211—chiller 220—ten-way valve 480 (port P55).

The heat medium circulating in the radiator circuit 230 flows through the following path: ten-way valve 480 (port P56)—water-cooled condenser 251—radiator 231—ten-way valve 480 (port P57).

The heat medium (coolant) circulating in the drive unit circuit 260 flows through the following path: ten-way valve 480 (port P58)—reservoir tank 265—water pump 261—SPU 262-PCU 263—oil cooler 264—ten-way valve 480 (port P52).

The heat medium (coolant) circulating in the battery circuit 270 flows through the following path: ten-way valve 480 (port P51)—battery 272—ten-way valve 480 (port P54).

Communication Patterns

Figure 19:
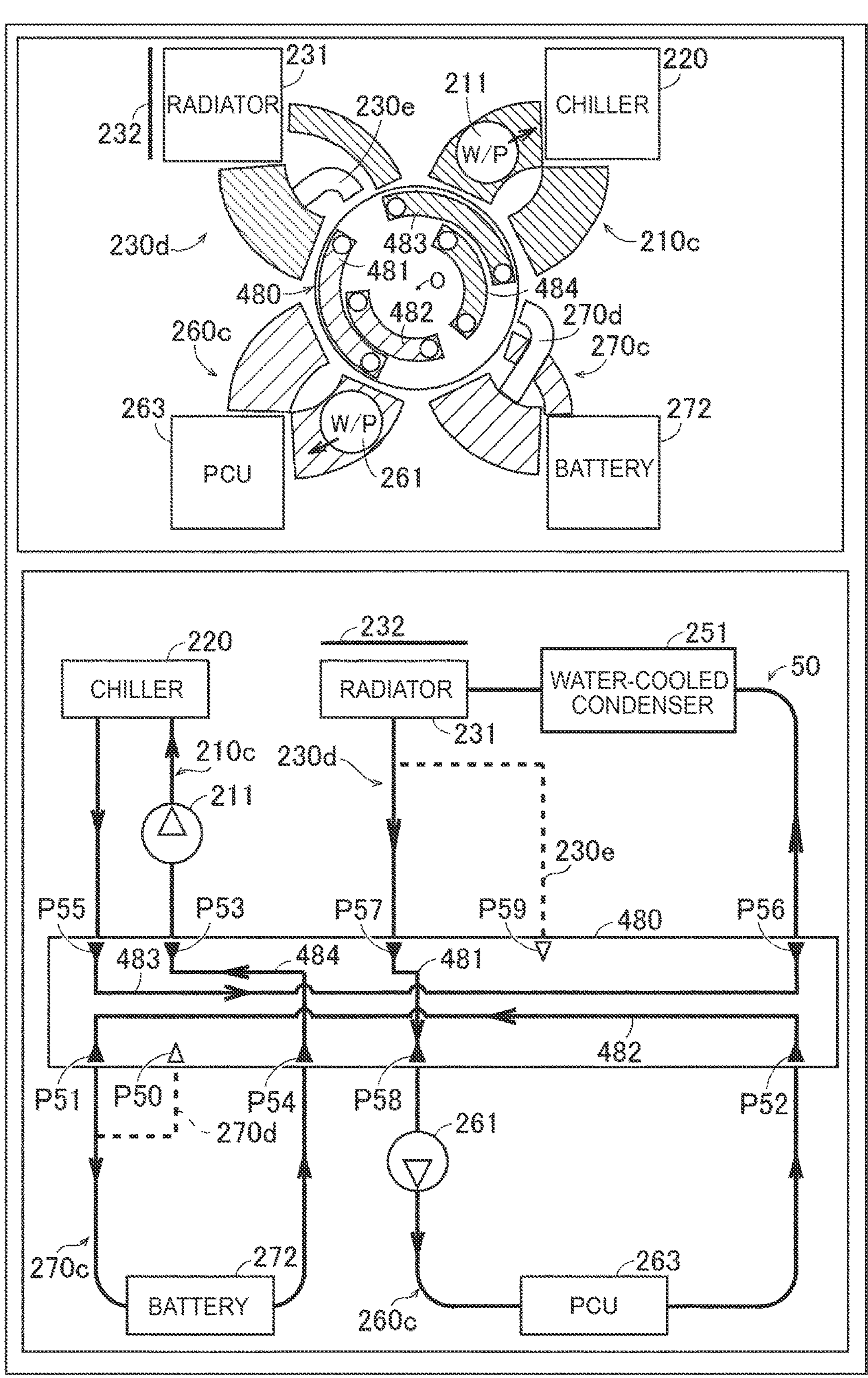
FIG. 19 shows the state of the thermal management circuit having a first communication pattern when heating a battery according to the fourth embodiment.

FIG. 19 shows the state of the thermal management circuit 400 having a first communication pattern when heating the battery 272. The upper part of FIG. 19 shows an example of the state of the thermal management circuit 400 having the first communication pattern when heating the battery 272. The lower part of FIG. 19 shows a schematic configuration of the thermal management circuit 400.

In the first communication pattern shown in FIG. 19, the ten-way valve 480 forms a path connecting the port P51 and the port P52 (internal flow path 482), a path connecting the port P53 and the port P54 (internal flow path 484), a path connecting the port P55 and the port P56 (internal flow path 483), and a path connecting the port P57 and the port P58 (internal flow path 481).

As a result, a closed circuit 50 is formed. The closed circuit 50 has one heat medium path in which the heat medium circulates through the flow path 230*d* where the radiator 231 etc. are provided, the flow path 260*c* where the PCU 263 etc. are provided, the flow path 210*c* where the chiller 220 etc. are provided, and the flow path 270*c* where the battery 272 etc. are provided. The closed circuit 50 formed by the first communication pattern is an example of the "heating circuit" of the present disclosure.

As shown in the upper part of FIG. 19, the ten-way valve 480 has a circular shape as viewed perpendicularly to the plane of the paper. The ten-way valve 480 includes a rotating element inside a housing. The rotating element has the internal flow paths 481, 482, 483, and 484 and is rotatable clockwise or counterclockwise by an actuator (not shown). When the actuator is driven according to a control command from the ECU 530, the rotating element rotates to change the connection of each port. The communication pattern of the thermal management circuit 400 is thus changed.

Method for Controlling Thermal Management Circuit

Figure 20:
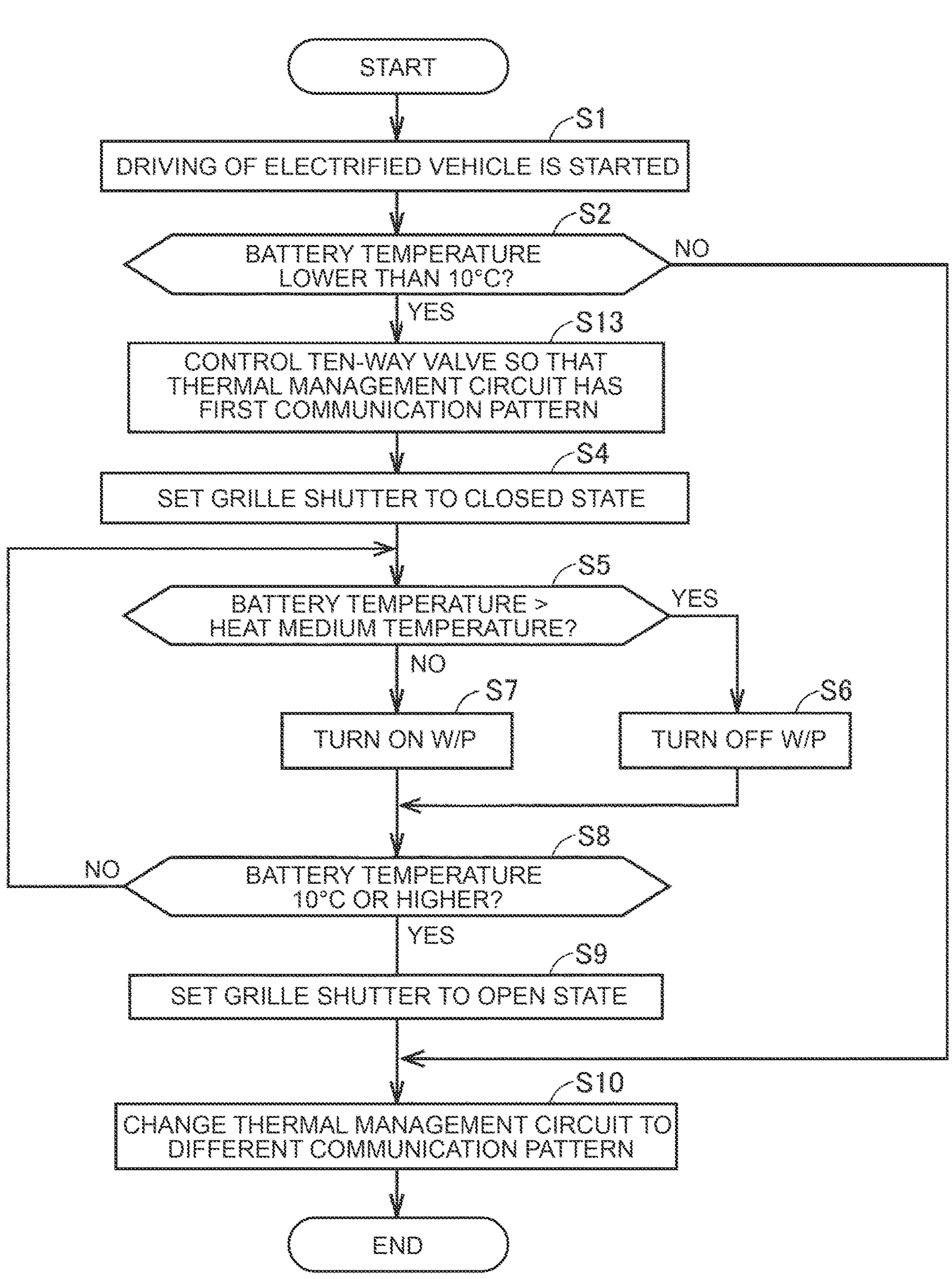
FIG. 20 is a flowchart showing a control that is performed by the thermal management system according to the fourth embodiment.

A control method of the thermal management system 4 will be described with reference to FIG. 20. FIG. 20 is a flowchart showing a control that is performed by the thermal management system 4 according to the fourth embodiment. The flow shown in FIG.

20 is merely illustrative, and the control in the present disclosure is not limited to the example shown in FIG. 20. Description of the same steps as those in the control flow of the third embodiment will be simplified or omitted.

When the ECU 530 determines in step S2 that the temperature of the battery 272 detected by the battery temperature sensor 273 is lower than 10° C. (Yes in S2), the process proceeds to step S13. When the temperature of the battery 272 is equal to or higher than 10° C. (No in S2), the process proceeds to step S10.

In step S13, the ECU 530 controls the ten-way valve 480 so that the thermal management circuit 400 has the first communication pattern shown in FIG. 19. The process then proceeds to S4.

In step S10, the ECU 530 controls the ten-way valve 480 to change the communication pattern of the thermal management circuit 400 from the first communication pattern shown in FIG. 19 to a different communication pattern (e.g., a communication pattern suitable for traveling of the electrified vehicle 1*a*). The process then ends.

Other configurations and effects of the fourth embodiment are the same as those of the third embodiment.

The fourth embodiment illustrates an example in which the ten-way valve 480 is controlled to form the first communication pattern when heating the battery 272.

However, the method for controlling the ten-way valve 480 is not limited to forming the first communication pattern, and the ten-way valve 480 may be controlled to form a second communication pattern, a third communication pattern, or a fourth communication pattern that will be described below instead of the first communication pattern.

Figure 21:
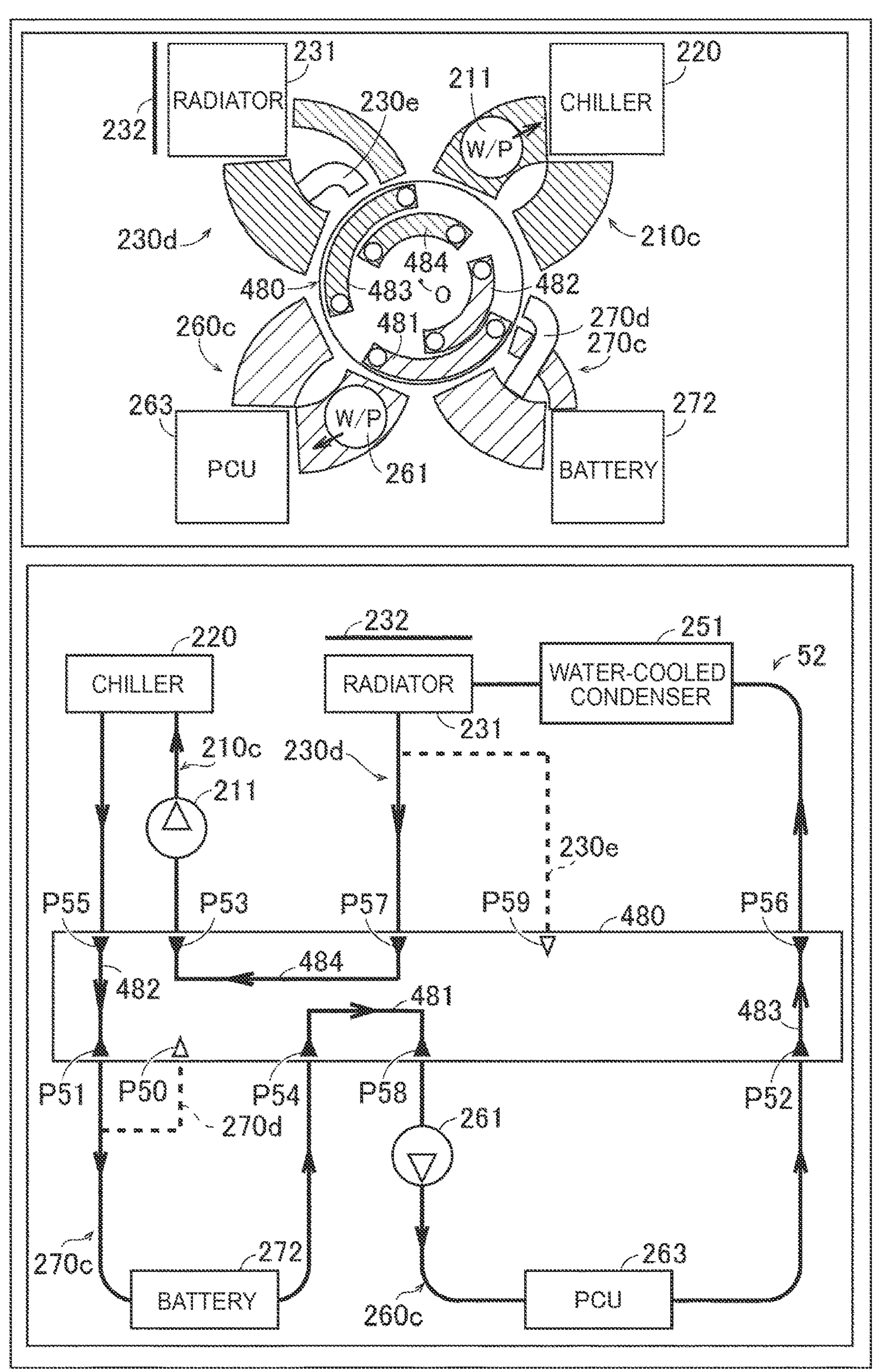
FIG. 21 shows the state of the thermal management circuit having a second communication pattern when heating the battery according to the fourth embodiment.

FIG. 21 shows the state of the thermal management circuit 400 having a second communication pattern when heating the battery 272 according to the fourth embodiment. The upper part of FIG. 21 shows an example of the state of the thermal management circuit 400 having the second communication pattern when heating the battery 272. The lower part of FIG. 21 shows a schematic configuration of the thermal management circuit 400.

The upper part of FIG. 21 shows the ten-way valve 480 with the rotating element rotated by a predetermined angle (e.g., about 90°) from the state shown in the upper part of FIG. 19.

In the second communication pattern shown in FIG. 21, the ten-way valve 480 forms a path connecting the port P51 and the port P55 (internal flow path 482), a path connecting the port P52 and the port P56 (internal flow path 483), a path connecting the port P53 and the port P57 (internal flow path 484), and a path connecting the port P54 and the port P58 (internal flow path 481).

As a result, a closed circuit 52 is formed. The closed circuit 52 has one heat medium path in which the heat medium circulates through the flow path 230*d* where the radiator 231 etc. are provided, the flow path 210*c* where the chiller 220 etc. are provided, the flow path 270*c* where the battery 272 etc. are provided, and the flow path 260*c* where the PCU 263 etc. are provided. The closed circuit 52 formed by the second communication pattern is an example of the "heating circuit" of the present disclosure.

Figure 22:
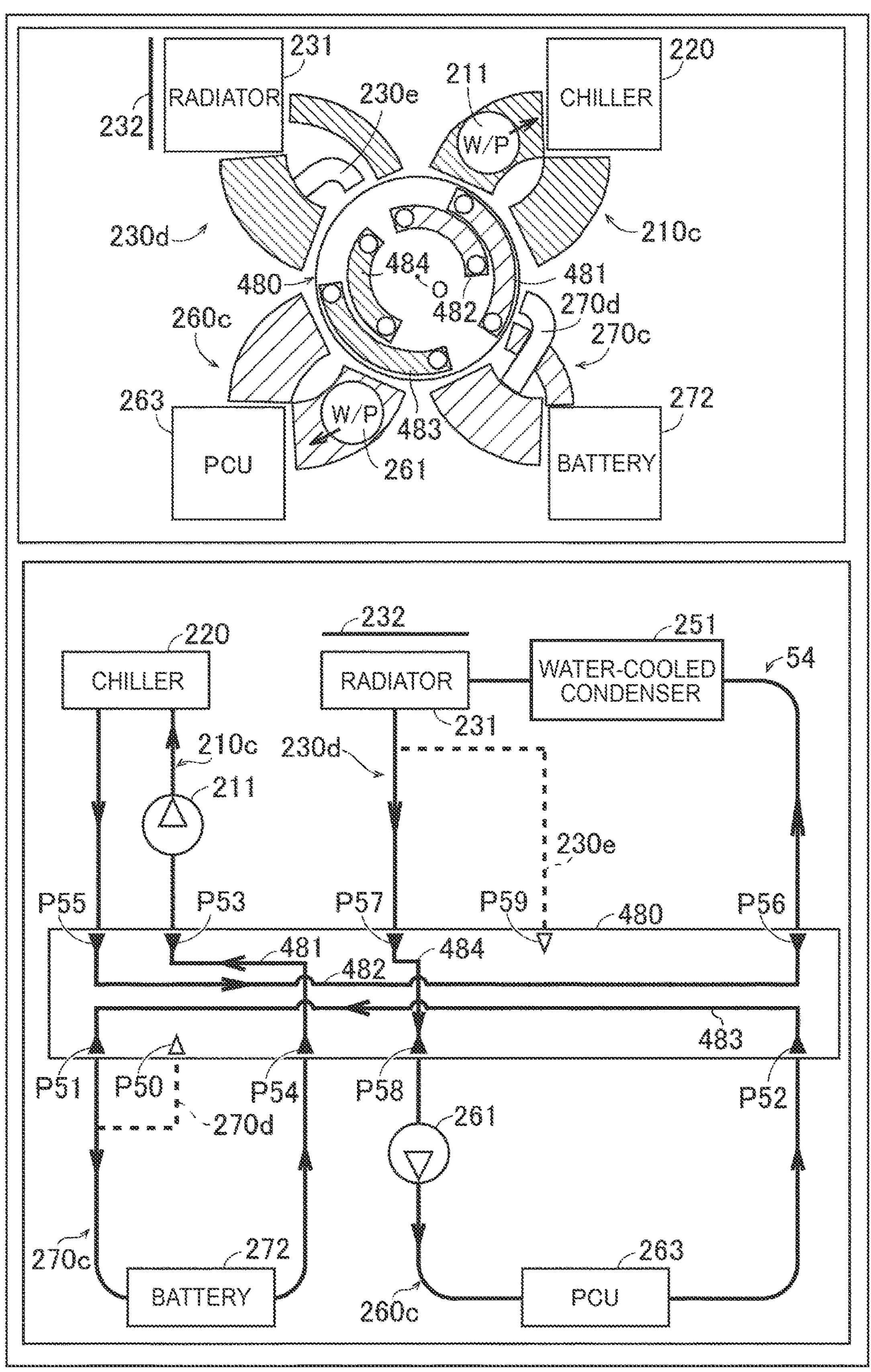
FIG. 22 shows the state of the thermal management circuit having a third communication pattern when heating the battery according to the fourth embodiment.

FIG. 22 shows the state of the thermal management circuit 400 having a third communication pattern when heating the battery 272 according to the fourth embodiment. The upper part of FIG. 22 shows an example of the state of the thermal management circuit 400 having the third communication pattern when heating the battery 272. The lower part of FIG. 22 shows a schematic configuration of the thermal management circuit 400.

The upper part of FIG. 22 shows the ten-way valve 480 with the rotating element rotated by a predetermined angle from the state shown in the upper part of FIG. 21.

In the third communication pattern shown in FIG. 22, the ten-way valve 480 forms a path connecting the port P51 and the port P52 (internal flow path 483), a path connecting the port P53 and the port P54 (internal flow path 481), a path connecting the port P55 and the port P56 (internal flow path 482), and a path connecting the port P57 and the port P58 (internal flow path 484).

As a result, a closed circuit 54 is formed. The closed circuit 54 has one heat medium path in which the heat medium circulates through the flow path 230*d* where the radiator 231 etc. are provided, the flow path 260*c* where the PCU 263 etc. are provided, the flow path 270*c* where the battery 272 etc. are provided, and the flow path 210*c* where the chiller 220 etc. are provided. The closed circuit 54 formed by the third communication pattern is an example of the "heating circuit" of the present disclosure.

Figure 23:
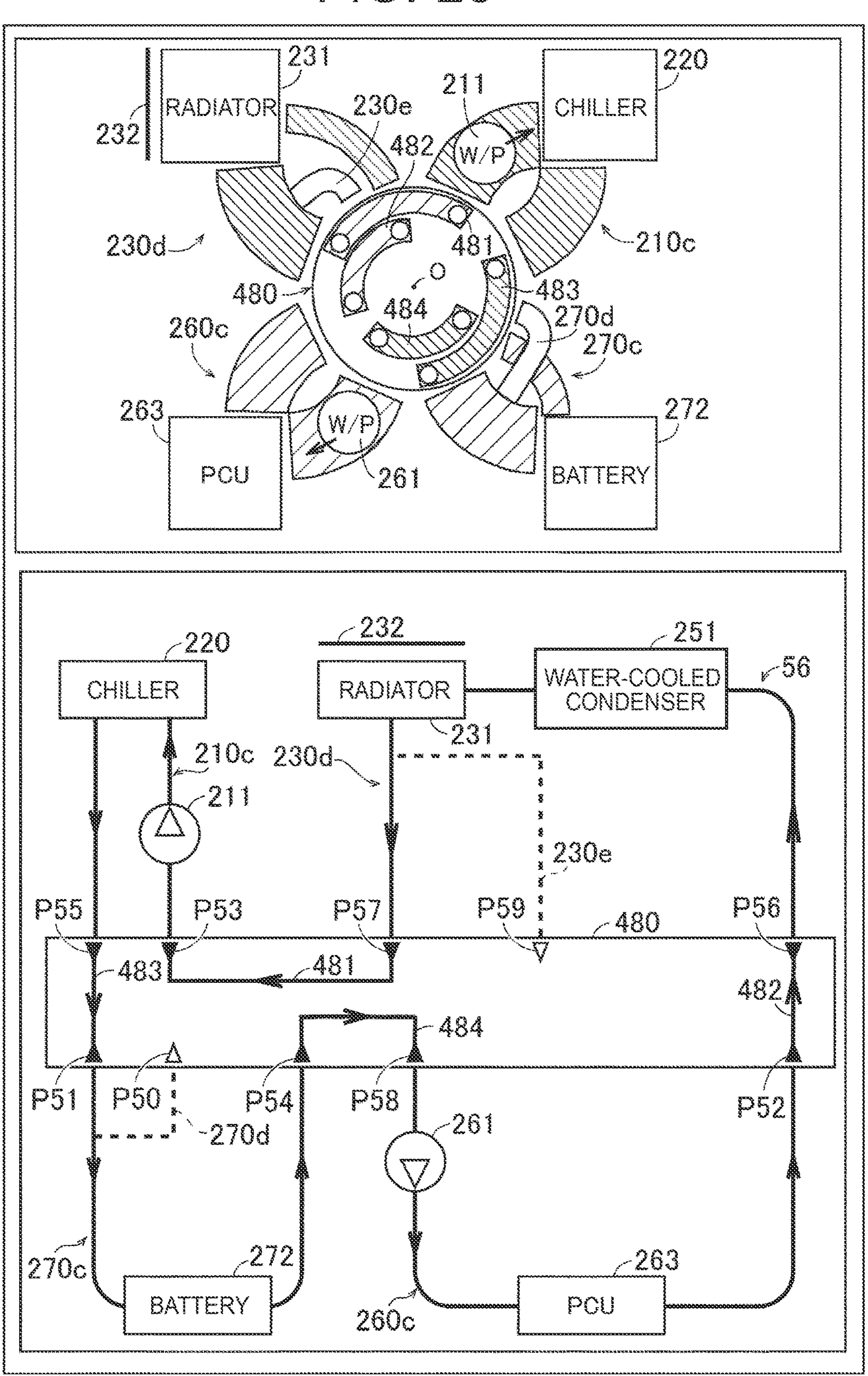
FIG. 23 shows the state of the thermal management circuit having a fourth communication pattern when heating the battery according to the fourth embodiment.

FIG. 23 shows the state of the thermal management circuit 400 having a fourth communication pattern when heating the battery 272 according to the fourth embodiment. The upper part of FIG. 23 shows an example of the state of the thermal management circuit 400 having the fourth communication pattern when heating the battery 272. The lower part of FIG. 23 shows a schematic configuration of the thermal management circuit 400.

The upper part of FIG. 23 shows the ten-way valve 480 with the rotating element rotated by a predetermined angle from the state shown in the upper part of FIG. 22.

In the fourth communication pattern shown in FIG. 23, the ten-way valve 480 forms a path connecting the port P51 and the port P55 (internal flow path 483), a path connecting the port P52 and the port P56 (internal flow path 482), a path connecting the port P53 and the port P57 (internal flow path 481), and a path connecting the port P54 and the port P58 (internal flow path 484).

As a result, a closed circuit 56 is formed. The closed circuit 56 has one heat medium path in which the heat medium circulates through the flow path 230*d* where the radiator 231 etc. are provided, the flow path 210*c* where the chiller 220 etc. are provided, the flow path 270*c* where the battery 272 etc. are provided, and the flow path 260*c* where the PCU 263 etc. are provided. The closed circuit 56 formed by the fourth communication pattern is an example of the "heating circuit" of the present disclosure.

The above configuration also has the effects of the fourth embodiment described above. The communication pattern may be switched among the first, second, third, and fourth communication patterns by controlling the ten-way valve 480. The ECU 530 may set the first communication pattern, the second communication pattern, the third communication pattern, or the fourth communication pattern as a communication pattern to be formed at the start of heating the battery 272, according to, for example, the total amount of circulating heat medium, the temperature of the battery 272, the temperature of the PCU 263, whether the heater is on or off, or the operating state of the water pump 211 or the water pump 261. Alternatively, the ECU 530 may switch the communication pattern from one of the first to fourth communication patterns to another one of the first to fourth communication patterns based on conditions such as the state of the battery 272 during heating and the heating time.

The first to fourth embodiments illustrate an example in which battery heating control is performed at the start of driving the electrified vehicle 1*a* (when the traction system is activated). However, the present disclosure is not limited to this. For example, the heating control may be performed at the start of external charging so that the temperature of the battery becomes equal to or higher than a predetermined temperature. External charging refers to charging the battery with charging power supplied from charging equipment (not shown) external to the electrified vehicle. The predetermined temperature is not particularly limited as long as it is within a temperature range that allows efficient charging of the battery. Alternatively, the battery heating control may be performed at the time of plug-in. Plug-in refers to plugging a charging plug into the electrified vehicle 1*a*. The battery heating control may be started before plug-in of the electrified vehicle 1*a*. For example, the battery heating control may be started a predetermined time (e.g., 10 minutes) before the scheduled start time of external charging (scheduled start time of supplying charging power). The heating control may be started a predetermined time (e.g., 30 minutes) before the scheduled start time of the following trip.

The first to fourth embodiments illustrate an example in which the thermal management system is mounted on an electrified vehicle. However, the present disclosure is not limited to this. The thermal management system may be mounted on an electrical apparatus different from an electrified vehicle (e.g., a stationary electrical storage device).

The first to fourth embodiments illustrate an example in which the control for switching the operating state of the water pump based on the comparison result between the battery temperature and the heat medium temperature is performed. However, the present disclosure is not limited to this. In addition to or instead of the above control, a control for switching whether to perform heat exchange in the chiller according to whether there is a request to turn on the heater may be performed. Alternatively, neither of the above two controls may be performed. Alternatively, during the period in which the water pump is operable, the water pump may be continuously kept on regardless of the comparison result between the battery temperature and the heat medium temperature, or the water pump may be intermittently operated or the speed of the water pump may be changed according to various temperature conditions such as the battery temperature and the heat medium temperature.

The first embodiment illustrates an example in which the thermal management circuit 100 includes the high temperature circuit 110. However, the present disclosure is not limited to this. The thermal management circuit 100 may not include the high temperature circuit 110. The thermal management circuit 200 of the second embodiment, the thermal management circuit 300 of the third embodiment, and the thermal management circuit 400 of the fourth embodiment may include a high temperature circuit having the same function as the high temperature circuit 110.

The first to fourth embodiments illustrate an example in which battery heating control is performed at the start of driving the electrified vehicle 1*a* (when the traction system is activated). However, the present disclosure is not limited to this. The heating control may be performed other than at the start of driving the electrified vehicle 1*a* (when the traction system is activated). For example, the heating control may be performed when the battery temperature falls below a predetermined threshold (10° C. in the above embodiments). In this case, the ECU may acquire the detected value of the battery temperature at predetermined intervals (e.g., every hour). The battery may be heated by causing a current larger than normal to flow through the battery with the battery heating communication pattern formed during traveling of the electrified vehicle 1*a*.

The configurations (processes) of the above embodiments and modifications may be combined.

Figure 24:
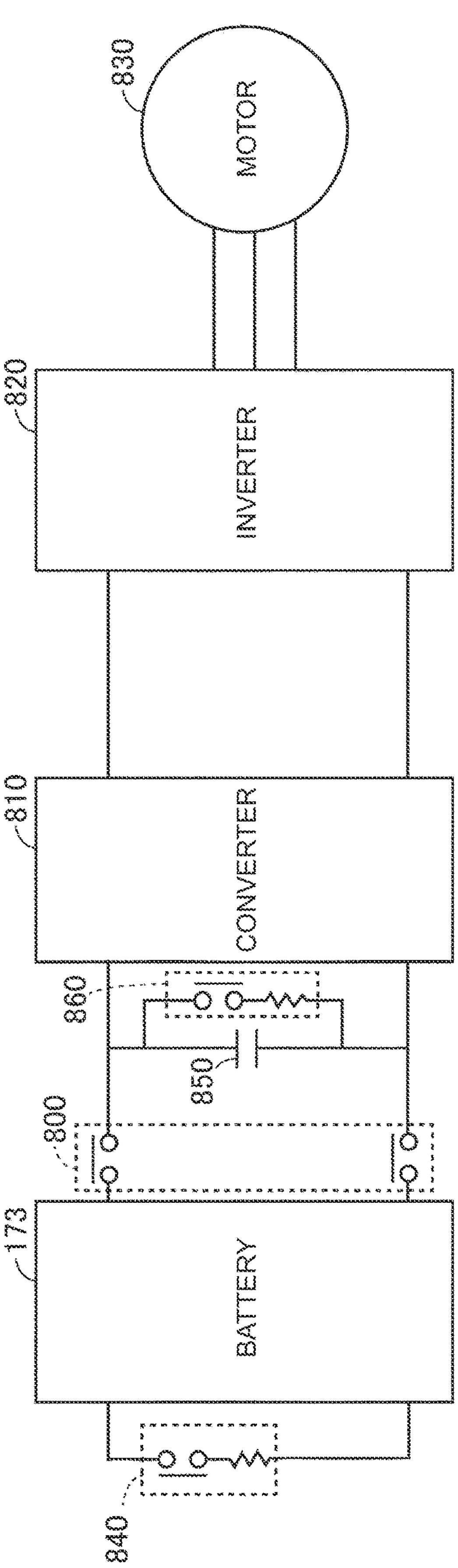
FIG. 24 shows a circuit configuration including a battery, a converter, an inverter, and a motor.

The heating control of the battery 173 will be described in detail with reference to FIG. 24. FIG. 24 shows a circuit configuration including the battery 173, a converter 810, an inverter 820, and a motor 830. The battery 173 is connected to the converter 810 via a system main relay (SMR) 800. The converter 810 is connected to the inverter 820. The inverter 820 is connected to the motor 830. A discharge circuit 840 including a switch and a resistive element is connected to the battery 173. A smoothing capacitor 850 is provided between the battery 173 and the converter 810. A discharge circuit 860 composed of a switch and a resistive element is connected in parallel with the smoothing capacitor 850. FIG. 24 is representatively illustrated based on the configuration of the first embodiment. However, the same configuration may be applied to the second to fourth embodiments.

The heating control of the battery 173 may include, for example, a control for electrically disconnecting the SMR 800 and turning on the switch of the discharge circuit 840. In this case, a current flows through the closed circuit formed by the battery 173 and the discharge circuit 840. The heating control of the battery 173 may include a control for turning off the switch of the discharge circuit 840 and turning on the SMR 800 and the switch of the discharge circuit 860. In this case, a current flows through the closed circuit formed by the battery 173, the SMR 800, and the discharge circuit 860. The heating control of the battery 173 may include a control for turning on the SMR 800 and turning off the switches of the discharge circuits 840, 860 to cause a current adjusted so that no torque is generated in the motor 830 to flow.

The embodiments disclosed herein should be considered as illustrative in all respects, and not restrictive. The scope of the present disclosure is set forth in the claims rather than in the above description of the embodiments, and is intended to include all modifications within the meaning and scope equivalent to those of the claims.

What is claimed is:

1. A thermal management system mounted on an electrical apparatus, the thermal management system comprising:

a first flow path, a second flow path, a third flow path, and a fourth flow path, each configured to allow a heat medium to flow through the flow path;

an electrical storage device configured to exchange heat with the heat medium in the first flow path;

a drive device configured to exchange heat with the heat medium in the second flow path and to supply a driving force to the electrical apparatus;

a radiator located in the third flow path;

a chiller device located in the fourth flow path; and a switching device configured to switch a connection state among the first flow path, the second flow path, the third flow path, and the fourth flow path, wherein the switching device is configured to cause a heating circuit to be formed when performing heating for increasing a temperature of the electrical storage device by causing a current to flow through the electrical storage device, the heating circuit including one heat medium path in which the heat medium circulates through the first flow path, the second flow path, the third flow path, and the fourth flow path, wherein:

the radiator is provided with a shutoff device configured to switch between an introducing state in which introduction of outside air into the radiator is allowed and a shutoff state in which the introduction of the outside air into the radiator is not allowed; and the shutoff device is configured to be switched to the shutoff state when the heating circuit is formed, and/or wherein:

the thermal management system further comprises:

a first temperature sensor configured to measure the temperature of the electrical storage device:

a second temperature sensor configured to measure temperature of the heat medium in the first flow path; and a pump configured to circulate the heat medium in the heating circuit, such that:

the pump is stopped when a measured value from the first temperature sensor is higher than a measured value from the second temperature sensor during the heating with the heating circuit formed; and the pump is driven when the measured value from the first temperature sensor is equal to or less than the measured value from the second temperature sensor during the heating with the heating circuit formed, and/or wherein:

the drive device is configured to supply the driving force to an electrified vehicle that is the electrical apparatus;

the chiller device is configured to exchange heat with an air conditioning circuit configured to adjust a cabin temperature of the electrified vehicle; and the switching device is configured to cause the heating circuit to be formed when there is a request to turn on a heater using the air conditioning circuit when performing the heating of the electrical storage device.

2. The thermal management system according to claim 1, wherein:

the drive device is configured to supply the driving force to an the electrified vehicle that is the electrical apparatus; and the heating of the electrical storage device is performed when a traction system of the electrified vehicle is activated.

3. The thermal management system according to claim 1, wherein:

the electrical storage device is configured to perform external charging, the external charging being charging of the electrical storage device with charging power supplied from charging equipment external to the electrical apparatus; and the heating of the electrical storage device is performed at start of the external charging in such a manner that the temperature of the electrical storage device becomes equal to or higher than a predetermined temperature.

4. The thermal management system according to claim 1, wherein in the heating circuit, the second flow path is located upstream of the first flow path in a flow of the heat medium.

5. A thermal management system mounted on an electrical apparatus, the thermal management system comprising:

a first flow path, a second flow path, a third flow path, and a fourth flow path, each configured to allow a heat medium to flow through the flow path;

an electrical storage device configured to exchange heat with the heat medium in the first flow path;

a drive device configured to exchange heat with the heat medium in the second flow path and to supply a driving force to the electrical apparatus;

a radiator located in the third flow path;

a chiller device located in the fourth flow path;

a switching device configured to switch a connection state among the first flow path. the second flow path, the third flow path, and the fourth flow path, wherein the switching device is configured to cause a heating circuit to be formed when performing heating for increasing a temperature of the electrical storage device by causing a current to flow through the electrical storage device, the heating circuit including one heat medium path in which the heat medium circulates through the first flow path. the second flow path, the third flow path, and the fourth flow path; and a control device, wherein:

the switching device includes a first five-way valve and a second five-way valve;

the first flow path connects the first five-way valve, the electrical storage device, and the second five-way valve in this order;

the second flow path connects the second five-way valve, the drive device, and the first five-way valve in this order;

the third flow path connects the first five-way valve, the radiator, and the second five-way valve in this order;

the fourth flow path connects the second five-way valve, the chiller device, and the first five-way valve in this order; and the control device is configured to form the heating circuit by controlling the first five- way valve and the second five-way valve in such a manner that the second flow path and the first flow path are connected via the first five-way valve, the first flow path and the fourth flow path are connected via the second five-way valve, the fourth flow path and the third flow path are connected via the first five-way valve, and the third flow path and the second flow path are connected via the second five-way valve.

6. A thermal management system mounted on an electrical apparatus, the thermal management system comprising:

a first flow path, a second flow path, a third flow path, and a fourth flow path, each configured to allow a heat medium to flow through the flow path;

an electrical storage device configured to exchange heat with the heat medium in the first flow path;

a drive device configured to exchange heat with the heat medium in the second flow path and to supply a driving force to the electrical apparatus;

a radiator located in the third flow path, a chiller device located in the fourth flow path;

a switching device configured to switch a connection state among the first flow path, the second flow path, the third flow path, and the fourth flow path, wherein the switching device is configured to cause a heating circuit to be formed when performing heating for increasing a temperature of the electrical storage device by causing a current to flow through the electrical storage device, the heating circuit including one heat medium path in which the heat medium circulates through the first flow path, the second flow path, the third flow path, and the fourth flow path; and a control device, wherein:

the switching device includes an eight-way valve;

the first flow path connects a first port of the eight-way valve, the electrical storage device, and a second port of the eight-way valve in this order;

the second flow path connects a third port of the eight-way valve, the drive device, and a fourth port of the eight-way valve in this order;

the third flow path connects a fifth port of the eight-way valve, the radiator, and a sixth port of the eight-way valve in this order;

the fourth flow path connects a seventh port of the eight-way valve, the chiller device, and an eighth port of the eight-way valve in this order; and the control device is configured to form the heating circuit by controlling the eight-way valve in such a manner that:

the first flow path and the second flow path are connected via the second port and the third port, the second flow path and the third flow path are connected via the fourth port and the fifth port, the third flow path and the fourth flow path are connected via the sixth port and the seventh port, and the fourth flow path and the first flow path are connected via the eighth port and the first port, or;

the control device is configured to cause the heating circuit to be formed by controlling the eight-way valve in such a manner that;

the second flow path and the first flow path are connected via the fourth port and the first port, the first flow path and the fourth flow path are connected via the second port and the seventh port, the fourth flow path and the third flow path are connected via the eighth port and the fifth port, and the third flow path and the second flow path are connected via the sixth port and the third port.

* * * * *